United States Patent
Ma

(10) Patent No.: US 11,855,511 B2
(45) Date of Patent: Dec. 26, 2023

(54) WIND POWER GENERATION UNIT, ELECTRIC MOTOR, AND AIRFLOW DELIVERY DEVICE FOR ELECTRIC MOTOR AIR GAP

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 364 days.

(21) Appl. No.: 17/043,932

(22) PCT Filed: Jul. 24, 2019

(86) PCT No.: PCT/CN2019/097399
§ 371 (c)(1),
(2) Date: Sep. 30, 2020

(87) PCT Pub. No.: WO2020/063074
PCT Pub. Date: Apr. 2, 2020

(65) Prior Publication Data
US 2021/0099046 A1  Apr. 1, 2021

(30) Foreign Application Priority Data
Sep. 28, 2018  (CN) .......................... 201811140760.7

(51) Int. Cl.
*H02K 5/20* (2006.01)
*F03D 80/60* (2016.01)
(Continued)

(52) U.S. Cl.
CPC ............... *H02K 5/207* (2021.01); *F03D 9/25* (2016.05); *F03D 80/60* (2016.05); *F03D 80/82* (2016.05);
(Continued)

(58) Field of Classification Search
CPC . F03D 9/25; F03D 80/60; F03D 80/82; F05B 2220/706; F05B 2260/208;
(Continued)

(56) References Cited

U.S. PATENT DOCUMENTS

2007/0236094 A1  10/2007  Kaminski et al.
2011/0133580 A1  6/2011  Sugimoto et al.
(Continued)

FOREIGN PATENT DOCUMENTS

CN  101051770 A  10/2007
CN  202187864 A  4/2012
(Continued)

OTHER PUBLICATIONS

International Search Report and Written Opinion issued in corresponding PCT Application No. PCT/CN2019/097399, dated Oct. 29, 2019, 14 pages.
(Continued)

*Primary Examiner* — Michael Andrews
(74) *Attorney, Agent, or Firm* — Bayes PLLC

(57) ABSTRACT

A wind power generation unit, an electric motor, and an airflow delivery for an electric motor air gap are provided. The airflow delivery device for the electric motor air gap comprises an annular air distribution chamber, wherein the annular air distribution chamber is located at at least one end of the air gap, and the annular air distribution chamber has a delivery port facing the air gap so as to deliver a hot or cold airflow to the air gap. The annular air distribution chamber is arranged at an end part of the air gap, the required airflow
(Continued)

is introduced into the annular air distribution chamber, and the annular air distribution chamber can output the accumulated airflow to the air gap, facilitating the airflow in flowing smoothly through the air gap, such that the flow of the air gap is relatively easy to control.

20 Claims, 21 Drawing Sheets

(51) Int. Cl.
| | |
|---|---|
| *F03D 9/25* | (2016.01) |
| *F03D 80/80* | (2016.01) |
| *H02K 7/18* | (2006.01) |
| *H02K 9/02* | (2006.01) |
| *H02K 9/12* | (2006.01) |
| *H02K 9/18* | (2006.01) |
| *H02K 9/22* | (2006.01) |

(52) U.S. Cl.
CPC ............ *H02K 7/1838* (2013.01); *H02K 9/02* (2013.01); *H02K 9/12* (2013.01); *H02K 9/18* (2013.01); *H02K 9/227* (2021.01); *F05B 2220/706* (2013.01); *F05B 2260/208* (2013.01); *F05B 2260/209* (2013.01); *F05B 2260/221* (2013.01)

(58) Field of Classification Search
CPC ......... F05B 2260/209; F05B 2260/221; H02K 5/207; H02K 5/20; H02K 9/227; H02K 9/22; H02K 9/02; H02K 9/12; H02K 9/18; H02K 7/1838
USPC ......................................... 310/52, 58, 59, 61
See application file for complete search history.

(56) References Cited

U.S. PATENT DOCUMENTS

| | | | | |
|---|---|---|---|---|
| 2012/0119602 A1* | 5/2012 | Himmelmann | ........ | H02K 9/197 310/54 |
| 2013/0293042 A1* | 11/2013 | Ribarov | ................... | H02K 9/08 310/59 |
| 2014/0054897 A1 | 2/2014 | Casazza et al. | | |
| 2014/0152154 A1* | 6/2014 | Kimura | ................... | H02K 9/08 310/60 R |
| 2014/0346781 A1 | 11/2014 | Airoldi et al. | | |
| 2015/0017033 A1 | 1/2015 | Sakkinen et al. | | |
| 2017/0081007 A1* | 3/2017 | Kosso | ................... | B63H 21/17 |
| 2018/0019642 A1 | 1/2018 | Wang et al. | | |
| 2018/0069442 A1* | 3/2018 | Ma | ............................ | F03D 9/25 |
| 2018/0080435 A1* | 3/2018 | Ma | ............................ | H02K 9/04 |

FOREIGN PATENT DOCUMENTS

| | | |
|---|---|---|
| CN | 103636103 A | 3/2014 |
| CN | 104369853 A | 2/2015 |
| CN | 104600886 A | 5/2015 |
| CN | 104810942 A | 7/2015 |
| CN | 105210273 A | 12/2015 |
| CN | 105553182 A | 5/2016 |
| CN | 105703541 A | 6/2016 |
| CN | 105736258 A | 7/2016 |
| CN | 106546090 A | 3/2017 |
| CN | 206060389 U | 3/2017 |
| CN | 107074338 A | 8/2017 |
| CN | 206442203 U | 8/2017 |
| CN | 107612172 A | 1/2018 |
| CN | 206962639 U | 2/2018 |
| CN | 207053275 U | 2/2018 |
| CN | 108258849 A | 7/2018 |
| CN | 109120104 A | 1/2019 |
| CN | 109681396 A | 4/2019 |

OTHER PUBLICATIONS

Extended European Search Report in corresponding European Application No. 19866407.0 dated Aug. 2, 2021 (9 pages).

* cited by examiner

WIND POWER GENERATION UNIT, ELECTRIC MOTOR, AND AIRFLOW DELIVERY DEVICE FOR ELECTRIC MOTOR AIR GAP

CROSS-REFERENCE TO RELATED APPLICATIONS

The present application is a National Phase entry of International Application No. PCT/CN2019/097399, filed on Jul. 24, 2019, which claims the priority to Chinese Patent Application No. 201811140760.7, titled "WIND POWER GENERATION UNIT, ELECTRIC MOTOR, AND AIRFLOW DELIVERY DEVICE FOR ELECTRIC MOTOR AIR GAP", filed with the China National Intellectual Property Administration on Sep. 28, 2018. The entire contents of each of the above-identified applications are incorporated herein by reference.

TECHNICAL FIELD

The present application relates to the technical field of electric motors, and in particular to a wind power generation unit, an electric motor, and an airflow delivery device for an air gap of the electric motor.

BACKGROUND

Referring to FIG. 1 and FIG. 2, FIG. 1 is a schematic diagram of an overall layout of an air partition heat exchanger for cooling an inside of a generator; FIG. 2 is a structural exploded schematic diagram of the partition heat exchanger in FIG. 1.

As shown in FIG. 1, a right side of a generator 500' is connected to an impeller 600', and a left side is provided with a nacelle 100', and a partition heat exchanger 300' is arranged in the nacelle 100', specifically at a rear portion of the nacelle 100'. The left side of a partition heat exchanger 300' is provided with an internal circulation induced draft fan 202', which is driven by an internal circulation driving motor 201', and the left side of the partition heat exchanger 300' is further provided with an internal circulation airflow leading-out delivery pipe 400'. Under the action of the internal circulation induced draft fan 202', the hot airflow generated by the generator 500' may enter the heat exchanger of the partition heat exchanger 300' along the internal circulation airflow leading-out delivery pipe 400'.

The partition heat exchanger 300' is further provided with an external circulation induced draft fan 102', and the external circulation induced draft fan 102' is driven by an external circulation driving motor 101'. The external circulation induced draft fan 102' introduces the natural ambient airflow into the heat exchange core of the partition heat exchanger 300', and the external circulation airflow after heat exchange flows out of the nacelle 100'. FIG. 1 shows an external circulation air outlet 103' connected to an outside. The internal circulation airflow is cooled and discharged out of the partition heat exchanger 300' and diffused in the tail space of the nacelle 100'.

In FIG. 2, when the internal circulation airflow is introduced, an internal circulation confluence chamber 203' is further arranged between the partition heat exchanger 300' and the internal circulation airflow leading-out delivery pipe 400', and both the upper and lower parts of the internal circulation confluence chamber 203' are provided with internal circulation airflow confluence inlets 203a'. An external circulation induced draft fan inlet connection section 104' is provided between the external circulation induced draft fan 102' and the partition heat exchanger 300', and an internal circulation induced draft fan inlet connection section 204' is provided between the internal circulation induced draft fan 202' and the partition heat exchanger 300'.

In FIG. 1, a shell of the generator 500' is provided with a cooling airflow inlet orifice plate 500a', which may be understood with reference to FIG. 3. FIG. 3 is a schematic diagram of a cooling airflow inlet orifice plate 500a' in FIG. 1.

The internal circulation fluid that has been cooled and diffused in the engine room may enter the generator 500' through an inlet hole 500b' of the cooling airflow inlet orifice plate 500a' and be reused as cooling airflow to cool an inside of the generator 500', such as the motor core.

However, the above-mentioned cooling scheme is still poor when cooling the iron core of the generator 500'.

SUMMARY

The present application provides an airflow delivery device for an electric motor air gap, where the air gap is formed between a rotor and a stator of the motor. The airflow delivery device includes an annular air distribution chamber which is located at at least one end of the air gap. The annular air distribution chamber is provided with a delivery port facing the air gap so as to deliver hot airflow or cold airflow to the air gap.

Preferably, the annular air distribution chamber includes an air intake nozzle, and the flow area of the air intake nozzle is gradually reduced along the air intake direction, or the air intake nozzle is a converging nozzle. The nozzle of the air intake nozzle forms the delivery port.

Preferably, the annular air distribution chamber is an annular through cavity; or, the annular air distribution chamber includes an air distribution chamber main body, where the air distribution chamber main body is separated into more than two sub air distribution chambers along the circumferential direction, and the air intake nozzle is separated into more than two sub air intake nozzles along the circumferential direction. Each sub air distribution chamber corresponds to one or more sub air intake nozzles.

Preferably, both ends of the air gap are provided with the annular air distribution chamber. The annular air distribution chamber further includes a return flow channel communicating with the middle of the air gap. Hot airflow or cold airflow flows to the air gap through the annular air distribution chamber, and flows out of the air gap from the return flow channel.

Preferably, the airflow delivery device for the electric motor air gap further includes an annular return flow chamber. The annular air distribution chamber is located at one end of the air gap, and the annular return flow chamber is located at the other end of the air gap. The annular return flow chamber is provided with a return flow port facing the air gap, and the hot airflow or the cold airflow flows through the air gap and then flows back to the annular return flow chamber through the return flow port.

Preferably, the annular return flow chamber further includes a return flow diffuser pipe, and the flow area of the return flow diffuser pipe is gradually increased along the airflow flow direction. The inlet of the return flow diffuser pipe forms the return flow port.

Preferably, the annular return flow chamber is an annular through cavity; or, the annular return flow chamber includes a return flow chamber main body, and the return flow chamber main body is separated into more than two sub return flow chambers along the circumferential direction. The return flow diffuser pipe is separated into more than two sub return flow diffuser pipes along its circumferential direction, and each sub return flow chamber corresponds to one or more sub return flow diffuser pipes.

Preferably, the airflow delivery device further includes a heat exchanger, and the airflow flow out of the annular return flow chamber is exchanged by the heat exchanger to form the cold airflow or the hot airflow entering the annular air distribution chamber.

Preferably, the heat exchanger is arranged outside the motor; the annular return flow chamber is provided with a first outlet and/or a second outlet, and the cold airflow or hot airflow can flow out through the first outlet, flow out of the motor after passing through the end of the motor winding and enter the heat exchanger; the cold airflow or the hot airflow can directly flow out of the motor through the second outlet and enter the heat exchanger.

Preferably, the heat exchanger includes a first partition heat exchanger arranged outside a top of a nacelle and/or a second partition heat exchanger arranged on a side wall of the nacelle.

Preferably, the airflow delivery device further includes a vortex separator; the hot airflow or cold airflow generated by the vortex separator can be delivered to the air gap.

Preferably, the hot airflow or the cold airflow generated by the vortex separator is connected to one end port position of the air gap.

Preferably, the airflow delivery device further includes a vortex separator and/or a heat exchanger. The vortex separator and the heat exchanger deliver hot airflow and cold airflow to the annular air distribution chamber.

Preferably, a blower is provided between the heat exchanger and the annular air distribution chamber.

The present application further provides a motor, including a stator, a rotor and a rotating shaft. The rotor is an inner rotor, and the motor further includes the airflow delivery device for electric motor air gap according to item eleven; the motor is provided with a delivery flow channel which penetrates the side wall of the rotating shaft and the rotor to communicate the inner cavity of the rotating shaft and the air gap. The cold airflow or hot airflow generated by the vortex separator is transported into the inner cavity of the rotating shaft and can enter the delivery flow channel.

Preferably, the vortex separator is communicated with the delivery flow channel through an air slip ring; or the vortex separator directly ejects hot airflow or cold airflow into the inner cavity of the rotating shaft, and then enters the delivery flow channel.

The present application further provides a motor, including a stator, a rotor and a rotating shaft. The rotor is an inner rotor, where, the motor further includes the airflow delivery device for electric motor air gap according to item 4; the motor is provided with a return flow channel. The return flow channel penetrates the side wall of the rotating shaft and the rotor to communicate the inner cavity of the rotating shaft and the middle of the air gap. The cold airflow or hot airflow entering the air gap flows through the return flow channel and enters the inner cavity of the rotating shaft.

Preferably, two or more return flow channels distributed along the circumferential direction of the motor are provided. The inner cavity of the rotating shaft is provided with a confluence chamber, and the airflow in each of the return flow channels flows into the confluence chamber and leads out of the inner cavity of the rotating shaft; the inner cavity of the rotating shaft is provided with an induced draft fan to draw out the airflow in the confluence chamber.

The present application further provides a motor, including a stator and a rotor. The rotor is an outer rotor, where, the motor further includes an airflow delivery device for electric motor air gap according to any one of the above; the annular air distribution chamber covers the ends of all the windings at one end of the stator.

The present application further provides a motor, including a stator, a rotor, and a rotating shaft, where, the motor further includes an airflow delivery device for electric motor air gap according to any one of the above.

Preferably, the airflow delivery device further includes a vortex separator and/or a heat exchanger. At least one of the vortex separator and the heat exchanger delivers airflow to the annular air distribution chamber.

The vortex separator is mounted on the end cover of the motor; or the motor is an outer stator motor, and the vortex separator is mounted on the shell of the outer stator.

The present application further provides a wind power generation unit, including a nacelle and a generator provided inside the nacelle, where the generator is the motor described in above twenty items.

Preferably, the airflow delivery device further includes a vortex separator and/or a heat exchanger. The vortex separator and the heat exchanger deliver hot airflow or cold airflow to the annular air distribution chamber; the heat exchanger is provided inside or outside the nacelle of the wind power generation unit.

Preferably, the heat exchanger is a partition heat exchanger arranged in the nacelle; the airflow delivery device further includes a transport pipeline. The transport pipeline transports the airflow out of the partition heat exchanger to the annular air distribution chamber.

Studies have found that the cooling airflow in the background technology is in a relatively disordered flow state after being delivered to the inside of the motor, with a great loss of kinetic energy, and only a part of it flows into the air gap, so the flow rate is small and uncontrollable. Furthermore, the radial height H of the air gap is actually very small, and only a thin air gap exists between the rotor and the stator. In the interior of a traditional motor, the space beyond the end of the air gap can be considered as a very wide space compared with this thin air gap, and it is very difficult for the airflow to suddenly enter this air gap from a very wide space. In terms of fluid mechanics, the air gap can be regarded as a local resistance, so the air inlet resistance of the air gap port structure is very large. The flow rate and velocity of the airflow with insufficient flow rate and low velocity are greatly limited after entering the air gap, and the cooling effect is poor.

In the solution of the present application, an annular air distribution chamber is provided at one end of the air gap, and the required airflow is injected into the annular air distribution chamber, and the annular air distribution chamber can output the accumulated airflow to the air gap, which helps the airflow to smoothly pass through the air gap, and the flow rate of the air gap is easier to control. It should be noted that cold airflow has a cooling effect (also has a certain drying effect), and hot airflow has a drying effect. Therefore, the present application is equipped with a special annular air distribution chamber, and the airflow can be collected in the annular air distribution chamber, which can be effectively output into the air gap and reduce the local resistance when entering the air gap. The airflow entering the air gap can contact the periphery of the entire iron core, thereby enhancing the cooling and drying effect of the iron core.

Further, the annular air distribution chamber in this embodiment is also provided with an air intake nozzle with a reduced or scaled flow area, and the air intake nozzle has an acceleration effect. It is equivalent to setting a drainage nozzle to eject the airflow in the annular air distribution chamber from the port of the air gap into the air gap, thereby greatly reducing the local resistance of the air gap port, obtaining high-quality airflow into the air gap, and ensuring the flow rate and velocity of the airflow into the air gap. After the flow rate is increased, the heat or moisture can be taken away faster, which has a better cooling or drying effect.

Figure 1:
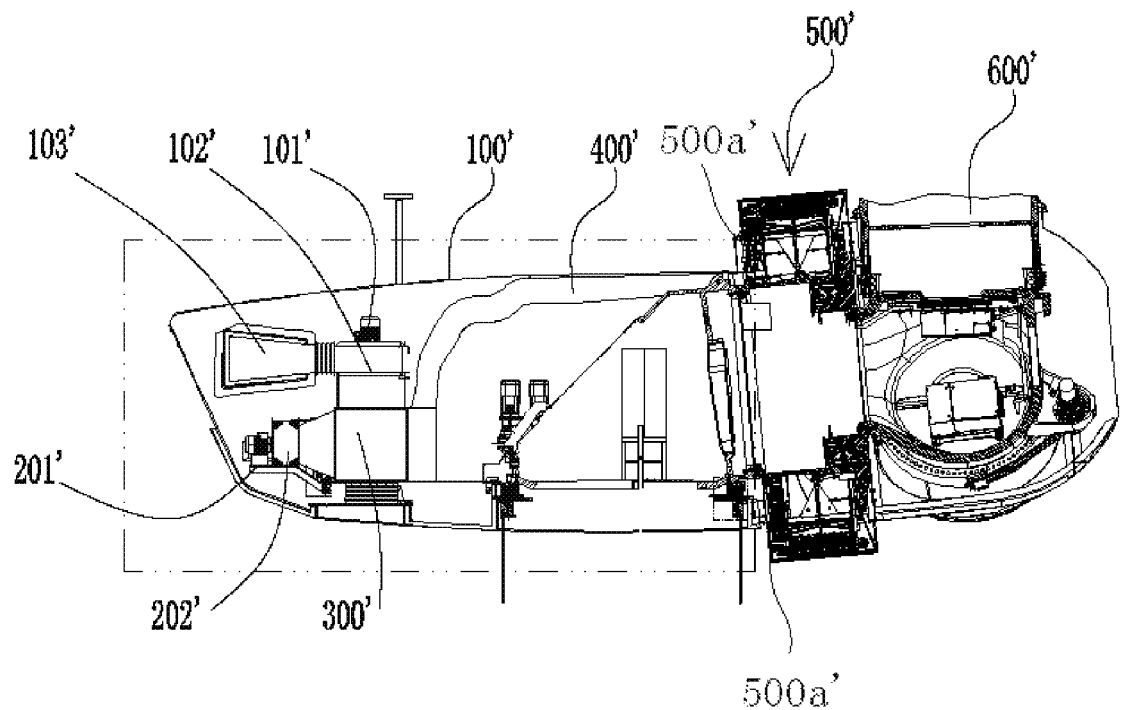
FIG. 1 is a schematic diagram of the overall layout of the air partition heat exchanger for cooling the inside of the generator.
Figure 2:
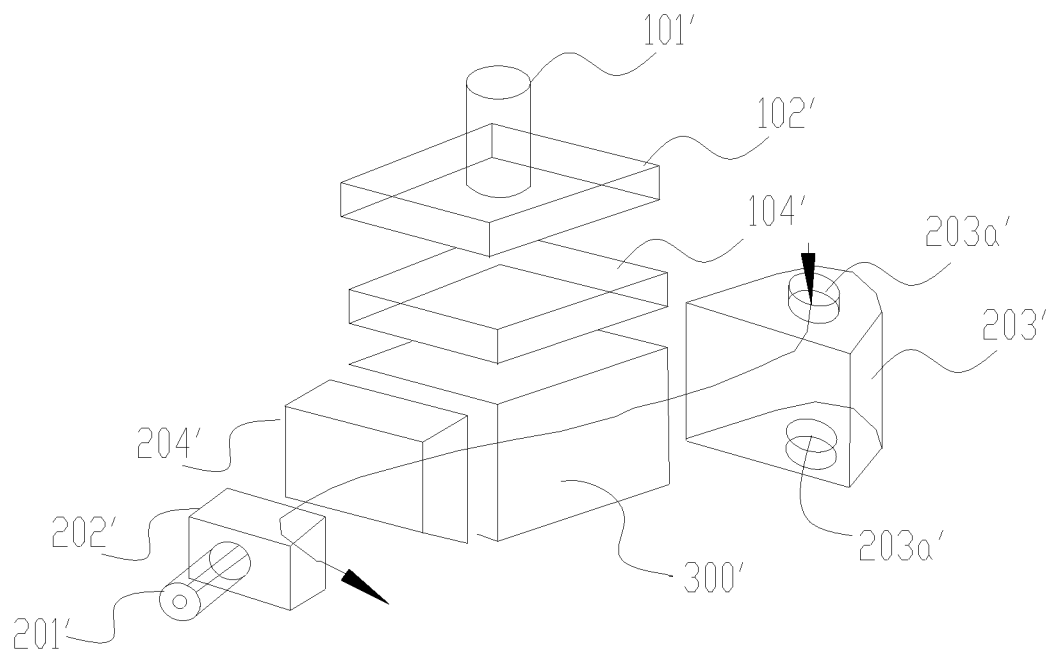
FIG. 2 is an exploded schematic diagram of the partition heat exchanger of FIG. 1.
Figure 3:
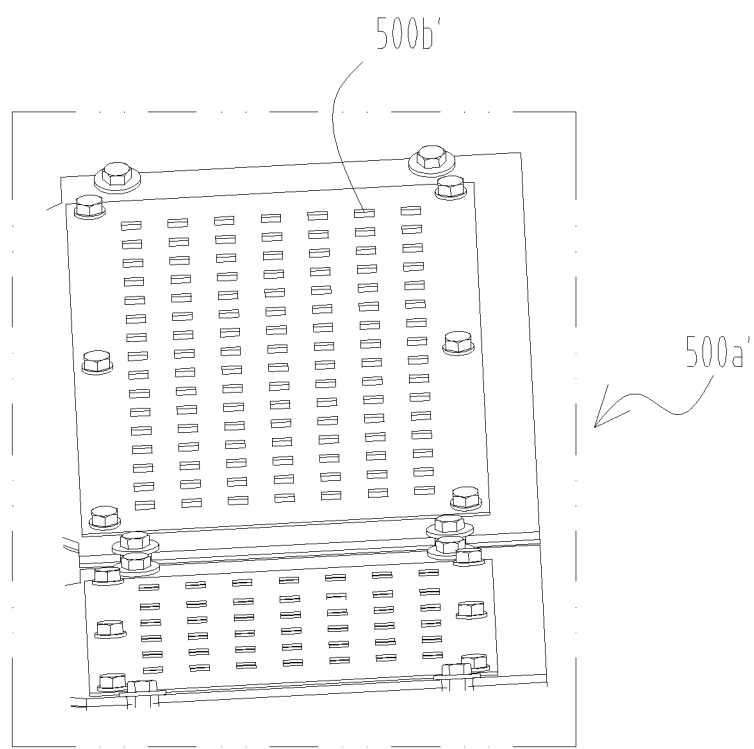
FIG. 3 is a schematic diagram of the cooling airflow inlet orifice in FIG. 1.

Reference numerals in FIGS. 1 to 3:

| Reference numerals in FIGS. 1 to 3: | |
|---|---|
| 100' nacelle | 101' external circulation driving motor |
| 102' external circulation induced draft fan | 103' external circulation air outlet |
| 104' external circulation induced draft fan inlet connection section | |
| 201' internal circulation driving motor | 202' internal circulation induced draft fan |
| 203' internal circulation confluence chamber | 203a' internal circulation airflow confluence inlet |
| 204' internal circulation induced draft fan inlet connection section | |
| 300' partition heat exchanger | 400' conveying pipe |
| 500' generator | 500a' cooling airflow inlet orifice plate |
| 500b' inlet hole | 600' impeller |
| Reference numerals in FIGS. 4 to 30: | |
| 100 nacelle | 200 tower |
| 10 stator | 101 iron core |
| 102 winding | 103 iron core bracket |
| 20 rotor | 201 magnetic pole |
| 202 rotating shaft | 203 bearing |
| 204 driving shaft | 205 coupling |
| 301 annular air distribution chamber | 301a sub air distribution chamber |
| 301b air inlet | |
| 302 annular return flow chamber | 302a sub return flow chamber |
| 302b return flow interface | 303 blower |
| 304 heat exchanger | 304a first partition heat exchanger |
| 304b second partition heat exchanger | 305 air intake nozzle |
| 305a sub air intake nozzle | 306 return flow diffuser pipe |
| 306a sub return flow diffuser pipe | 307 return flow channel |
| 308 induced draft fan | 309 confluence chamber |
| 310 delivery flow channel | 311 vortex separator |
| 3111 vortex separation tube | 3112 nozzle |
| 3111a vortex chamber | 3111b hot end pipe section |
| 3111c cold end pipe section | 3111d cold end |
| 3111e hot end | 3111a1 end plate |
| 3113 throttle piece | 312 three-way valve |
| 313 transport pipeline | 314 transport nozzle |
| 315 inlet interface | 316 outlet interface |
| 317 confluence delivery chamber | 40 gearbox |
| 50 impeller | 601 yaw bearing |
| 602 pitch bearing | 70 wheel hub |
| 80 compressor | 801 compressor |
| 802 air filter | 90 air-liquid separator |
| a air gap | b delivery port |
| c return flow port | d first outlet |
| e second outlet | |

DETAILED DESCRIPTION

In order to provide those skilled in the art a better understanding of the solutions of the present application, the present application is described hereinafter in further detail in conjunction with the drawings and embodiments.

The present solution provides an airflow delivery device for an air gap of an electric motor, and the air gap a is formed between a rotor and a stator of the motor. The airflow delivery device includes an annular air distribution chamber 301 which is located at at least one end of the air gap. The annular air distribution chamber 301 is provided with a delivery port facing the air so as to deliver hot airflow or cold airflow to the air gap. The annular shape here is not limited to a circular shape. Since the annular air distribution chamber 301 needs to deliver airflow to the air gap a, the annular air distribution chamber 301 could preferably match the shape of the air gap a, and the radial cross section of the air gap a is not necessarily circular, which depends on the shape of the stator and rotor.

Specific reference can be made to the following embodiments.

First Embodiment

Figure 4:
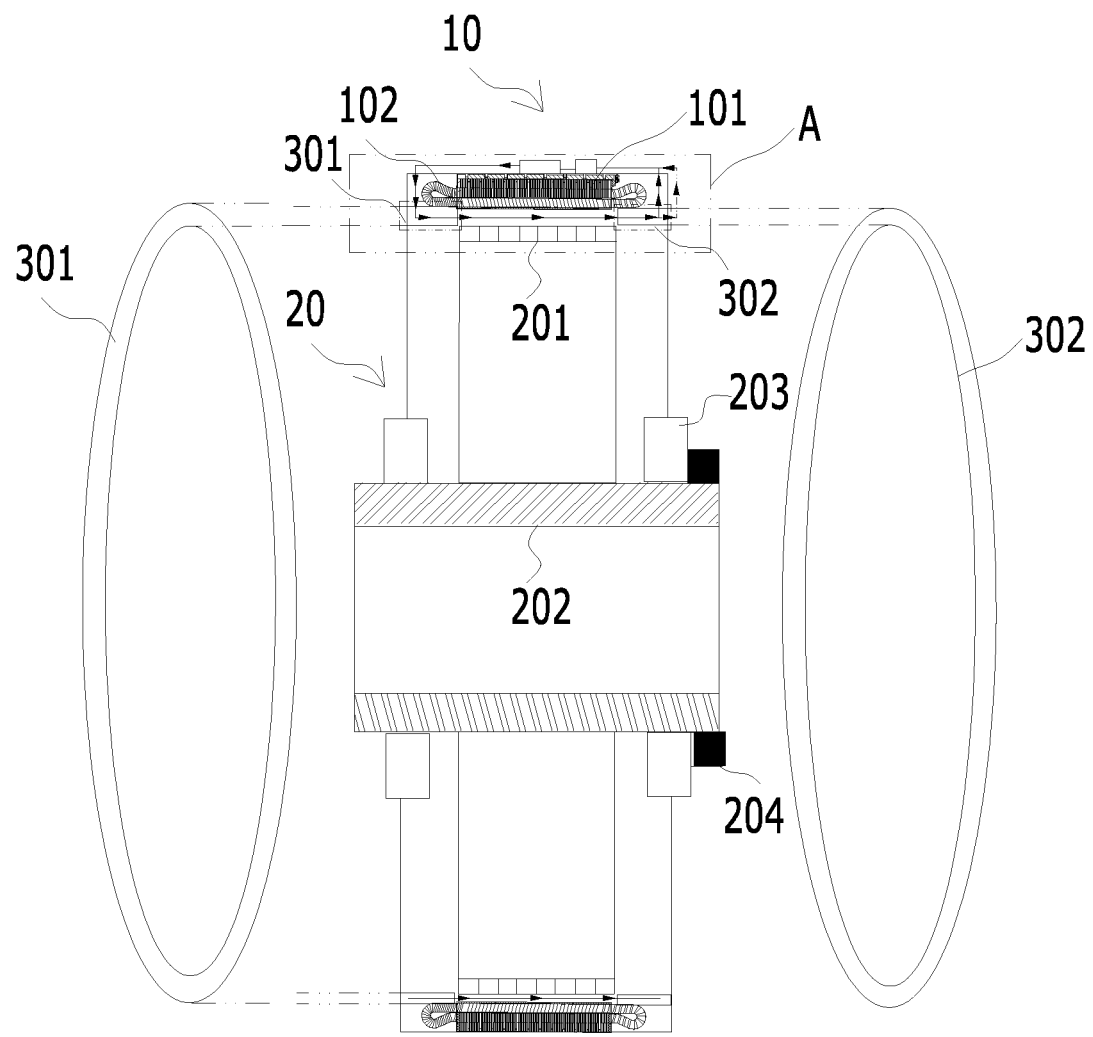
FIG. 4 is a schematic structural diagram of a first embodiment of an inner rotor permanent magnet pole motor provided by the present application.
Figure 5:
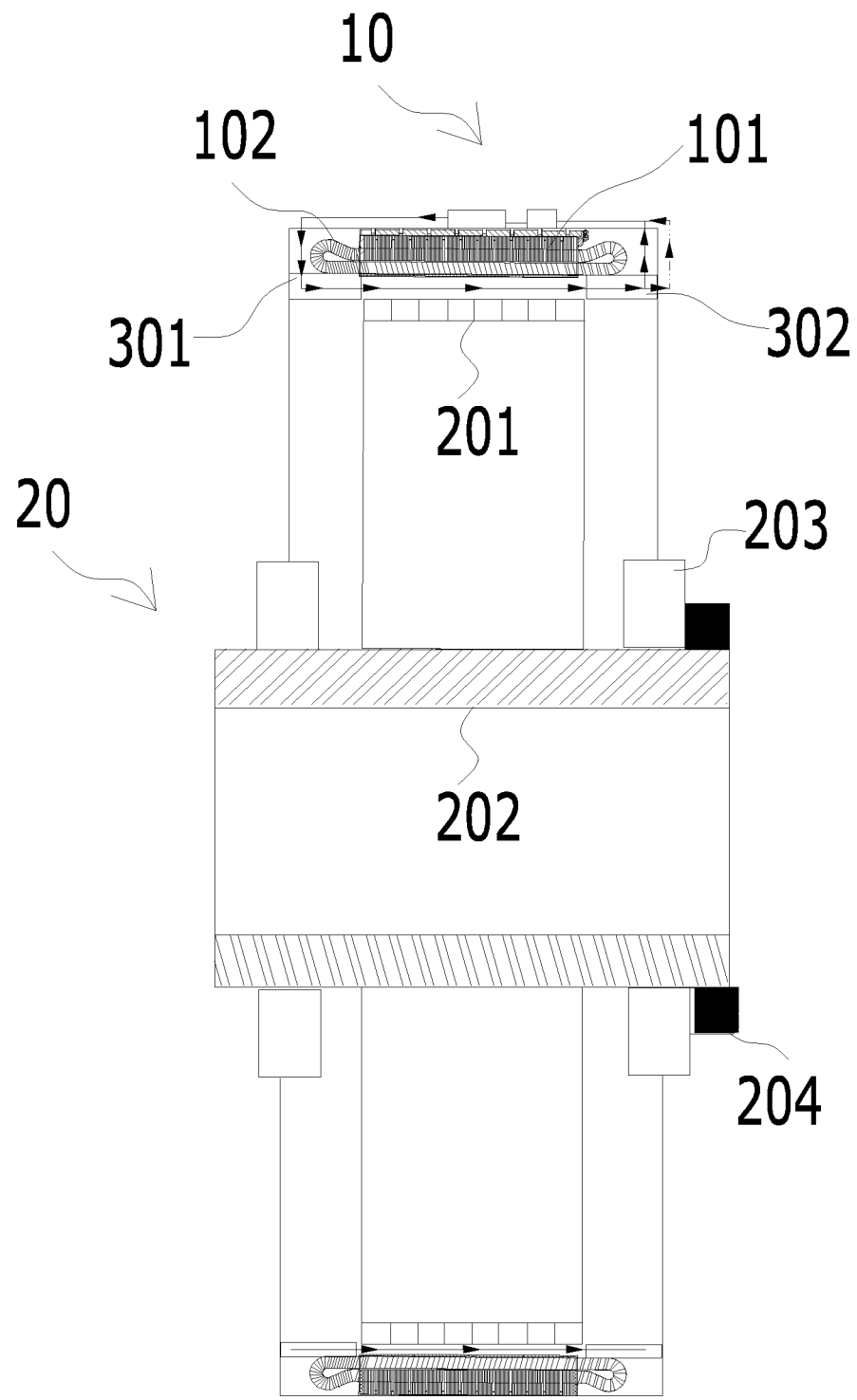
FIG. 5 is a schematic diagram of the motor in the middle of FIG. 4.
Figure 6:
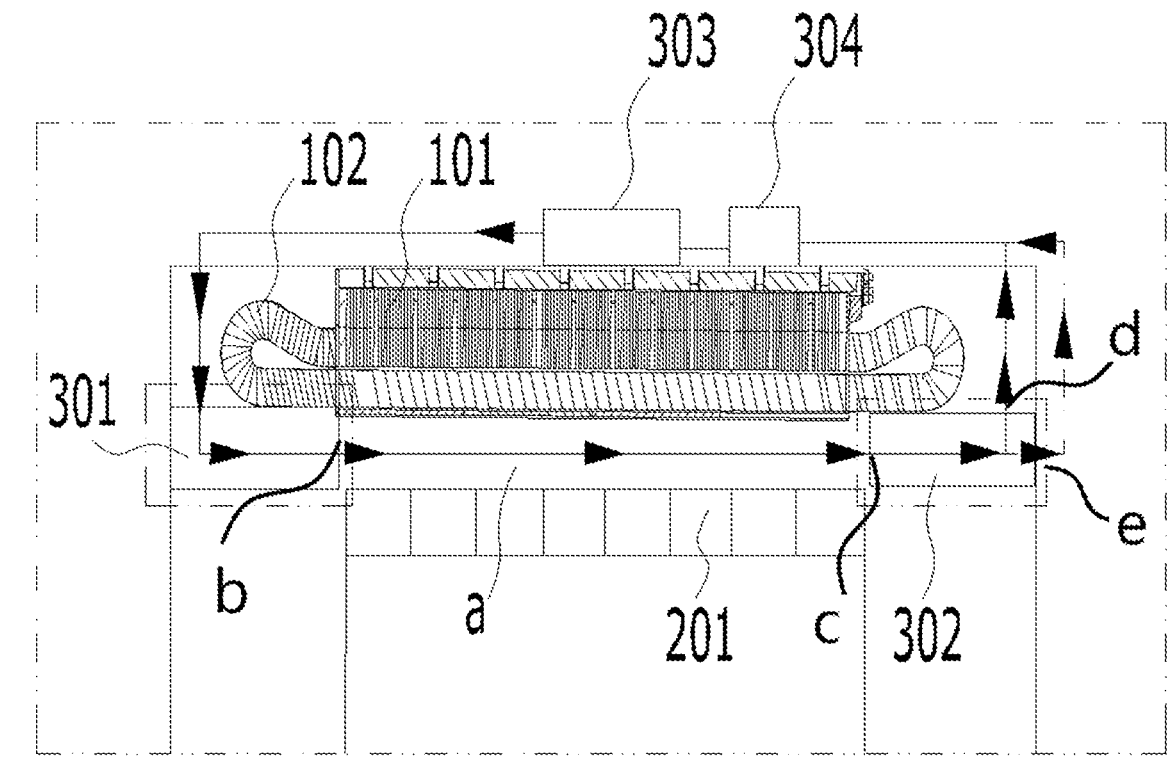
FIG. 6 is a partial enlarged view of part A in FIG. 4.
Figure 7:
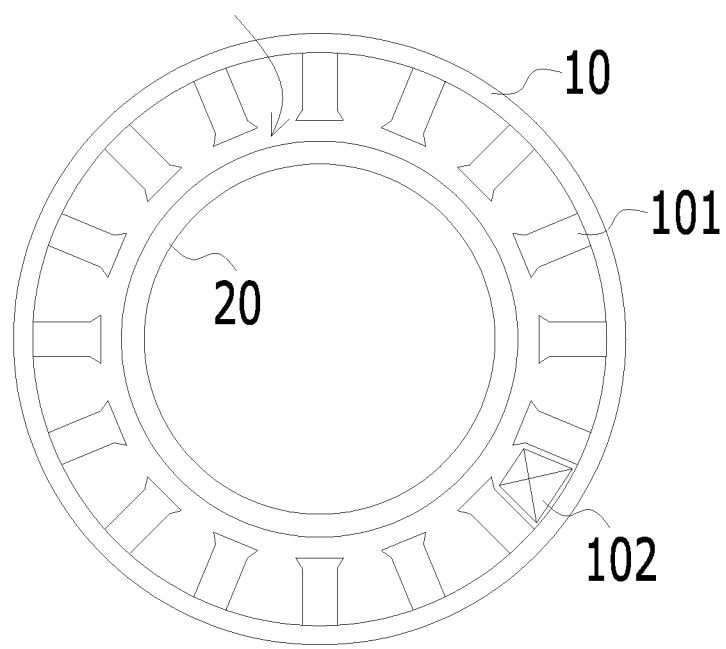
FIG. 7 is a schematic view of the end of the inner rotor permanent magnet pole motor.

Referring to FIG. 4, FIG. 4 is a schematic structural diagram of a first embodiment of an inner rotor permanent magnet pole motor provided by the present application; FIG. 5 is a schematic diagram of the motor in the middle of FIG. 4; FIG. 6 is a partial enlarged view of part A in FIG. 4; FIG. 7 is a schematic view of the end of the inner rotor permanent magnet pole motor.

The motor includes a rotor 20 and a stator 10. The rotor 20 is of an inner rotor structure, that is, the rotor 20 is located in an inner cavity of the stator 10. The stator 10 includes an iron core 101 and multiple windings 102 wound around the iron core 101. The rotating shaft 202 of the rotor 20 is inserted into an end cover of the motor through a bearing 203. The rotating shaft 202 is also connected to a driving shaft 204, and is driven to rotate by the driving shaft 204. As shown in FIG. 6, there is an air gap a between the rotor 20 and the stator 10, and the air gap a extends in an axial direction of the motor. Further reference can be made to FIG. 7, and the air gap a between the stator 10 and the rotor 20 is actually annular.

The airflow delivery device provided by the present solution delivers airflow to the air gap a of the motor, so an annular air distribution chamber 301 corresponding to the air gap a is provided. The middle of the view in FIG. 4 is an axial sectional view of the motor (i.e., the view in FIG. 5). The axial sectional view can only show the axial section of the annular air distribution chamber 301. The annular air distribution chamber 301 illustrated in the leftmost side and the annular return flow chamber 302 illustrated in the rightmost side of FIG. 4 (which will be described in detail below) are convenient for understanding the positions and shapes of the annular air distribution chamber 301 and the annular return flow chamber 302 in FIG. 4 when viewed from both ends.

The annular air distribution chamber 301 is located at at least one end of the air gap a. In the first embodiment, the annular air distribution chamber 301 is located only at one end of the air gap a, and another end is provided with the annular return flow chamber 302. The annular air distribution chamber 301 has a delivery port b, and the annular return flow chamber 302 has a return flow port c. The annular air distribution chamber 301 and the annular return flow chamber 302 may right face the port of the air gap a to cover the end of the air gap a. In this way, the airflow (referring to cold airflow or hot airflow, which is the same in following embodiments) can enter the air gap a through the annular air distribution chamber 301, then flow back to the annular return flow chamber 302, and flow out through the annular return flow chamber 302.

It should be noted that, the annular air distribution chamber 301 and the annular return flow chamber 302 are not limited to the ports right facing the air gap a, as long as they are located near the ports of the air gap a and can deliver airflow into the air gap a. In addition, in this embodiment, the annular air distribution chamber 301 includes an air intake nozzle 305, and the annular return flow chamber 302 includes a return flow diffuser pipe 306. An nozzle of the air intake nozzle 305 forms the delivery port b of the annular air distribution chamber 301, and an inlet of the return flow diffuser pipe 306 forms the return flow port c of the annular return flow chamber 302. The nozzle of the air intake nozzle 305 and the inlet of the return flow diffuser pipe 306 right face the port of the air gap a.

Figure 8:
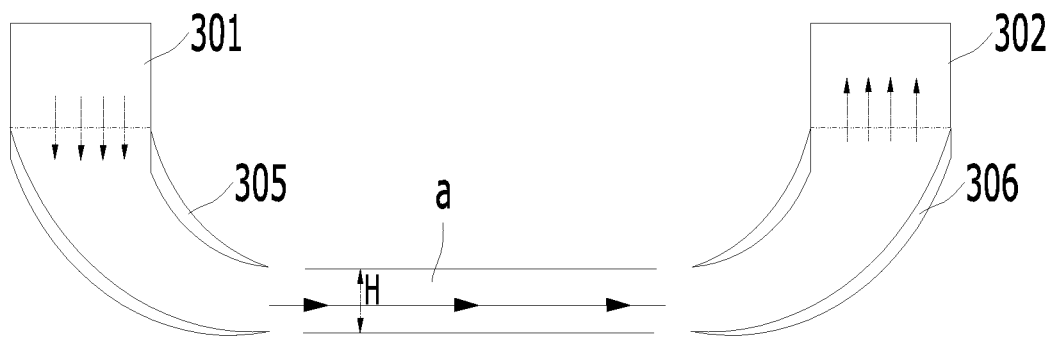
FIG. 8 is a partial view of the annular air distribution chamber, air gap and annular return flow chamber in FIG. 4.

Specific reference can be made to FIG. 8, and FIG. 8 is a partial view of the annular air distribution chamber 301, the air gap a and the annular return flow chamber 302 in FIG. 4.

As shown in FIG. 8, the flow area of the air intake nozzle 305 is gradually reduced along the intake direction, that is, from left to right as shown in FIG. 8. The flow area of the return flow diffuser pipe 306 is gradually increased along the airflow direction, that is, from left to right as shown in FIG. 8. Single-headed arrows in FIG. 8 indicate the flow direction of the fluid. At the position of the air gap a, there is also a double-headed arrow indicating that the radial height of the air gap a is H (which is the same in other embodiments).

The airflow entering the annular air distribution chamber 301 is ejected from the air intake nozzle 305 and delivered into the air gap a. After passing through the air gap a, the airflow enters the return flow diffuser pipe 306 from the other end of the air gap a, then enters a main chamber of the annular return flow chamber 302, and finally flows out.

Studies have found that cooling airflow in the background technology is in a relatively disordered flow state after being delivered to the inside of the motor, with a great loss of kinetic energy, and only a part of it flows into the air gap a, so the flow rate is small and uncontrollable. Furthermore, the radial height H of the air gap is actually very small, and only a thin air gap a exists between the rotor and the stator. In an interior of a traditional motor, however, the space beyond the end of the air gap can be considered as a very wide space compared with this thin air gap a, and it is very difficult for the airflow to suddenly enter this air gap a from a very wide space. In terms of fluid mechanics, the air gap a can be regarded as a local resistance, so the air inlet resistance of a port of the air gap a is very large. The flow rate and velocity of the airflow with insufficient flow rate and low velocity are greatly limited after entering the air gap a, and the cooling effect is poor.

In the embodiment, an annular air distribution chamber 301 is provided at one end of the air gap a, and the required airflow is injected into the annular air distribution chamber 301, and the annular air distribution chamber 301 can output the accumulated airflow to the air gap a, which helps the airflow smoothly pass through the air gap a, and the flow rate of the air gap a is easier to control. It should be noted that cold airflow has a cooling effect (also has a certain drying effect), and hot airflow has a drying effect. Therefore, the present application is equipped with a special annular air distribution chamber 301, and the airflow can be collected in the annular air distribution chamber 301, which can be effectively output into the air gap a and reduce the local resistance when the airflow entering the air gap a. The airflow entering the air gap a can contact the periphery of the entire iron core 101, thereby the cooling and drying effect of the iron core 101 is enhanced.

Further, the annular air distribution chamber 301 in this embodiment is also provided with an air intake nozzle 305 with a reduced flow area, and the air intake nozzle 305 has an acceleration effect for the airflow. It is equivalent to setting a drainage nozzle to eject the airflow in the annular air distribution chamber 301 from the port of the air gap a into the air gap a, thereby greatly reducing the local resistance of the port of the air gap a, obtaining high-quality airflow into the air gap a, and ensuring the flow rate and velocity of the airflow into the air gap a. After the flow rate is increased, the heat or moisture can be taken away faster, which has a better cooling or drying effect.

In addition, as the airflow flows out of the port of the air gap a, there is also a sharp change in space, that is, the airflow may suddenly expand from the thin air gap a into a very wide space compared to the air gap a. At this time, the flow rate of the airflow must is greatly reduced, and the airflow become disordered and expand to the surroundings, thereby accumulating near the end of the air gap a, which may affect the subsequent airflow and cause very high local resistance. For example, when a diver quickly jumps into the water, he soon stagnates and no longer continues to go deep into the water, and all his previous kinetic energy is exhausted. Since the local resistance of the port of the air gap a is large, the airflow is not easy to flow out of the air gap a. In this embodiment, a return flow diffuser pipe 306 is also provided, and the flow area of the return flow diffuser pipe 306 is gradually increased, which plays a role of diffusion, which facilitates the airflow in the air gap a flowing out of the air gap a with sufficient pressure and then entering a main body of the annular return flow chamber 302. That is, the airflow can smoothly flow out of the air gap a, which in turn helps the upstream airflow to enter faster.

It can be seen that in this embodiment, when the air intake nozzle 305 and the return flow diffuser pipe 306 are provided at the same time, it is equivalent to setting the drainage and diffuser structure, which completely changes the situations that the port resistance of the air gap a is large and the airflow is difficult to cross the air gap a in the traditional motor. Moreover, it is possible to continuously deliver the airflow into the air gap a, and at the same time, the airflow is quickly discharged after flowing, thereby greatly improving the Reynolds number, Nuchet number and surface heat transfer coefficient of the airflow, and bringing about an increase in the heat transfer rate. Furthermore, the surface heat transfer, mass transfer coefficient and speed of the air gap a are improved, and the effects of convective heat transfer and convective mass transfer (i.e. drying) are enhanced.

The above annular return flow chamber 302 is also provided at the port of the air gap a to facilitate the recovery of the airflow. At the same time, the return flow diffuser pipe 306 with a gradually increasing flow area is provided to further guide the airflow to flow out. It can be understood that the annular return flow chamber 302 may not be provided, and the annular air distribution chamber 301 is not limited to the air intake nozzle 305, because the annular air distribution chamber 301 itself has achieved the purpose of guiding the airflow into the air gap a well, and increasing the flow rate and velocity of the airflow entering the air gap a. Of course, it is a more preferable solution to provide the air intake nozzle 305.

As mentioned above, since the air gap a is an annular air gap, the annular air distribution chamber 301 and the annular return flow chamber 302 are both set in an annular shape for matching, and accordingly, the air intake nozzle 305 and the return flow diffuser pipe 306 of both are also annular.

Herein, the annular air distribution chamber 301 and the annular return flow chamber 302 may be annular through cavities. In fact, a main body of the annular air distribution chamber 301 and the air intake nozzle 305 may be integrated or communicated separately, and the main body of the annular return flow chamber 302 and the return flow diffuser pipe 306 can also be integrated or communicated separately.

Specifically, in this embodiment, the annular air distribution chamber 301 and the annular return flow chamber 302 are not circumferentially penetrated, but are separated.

Figure 9:
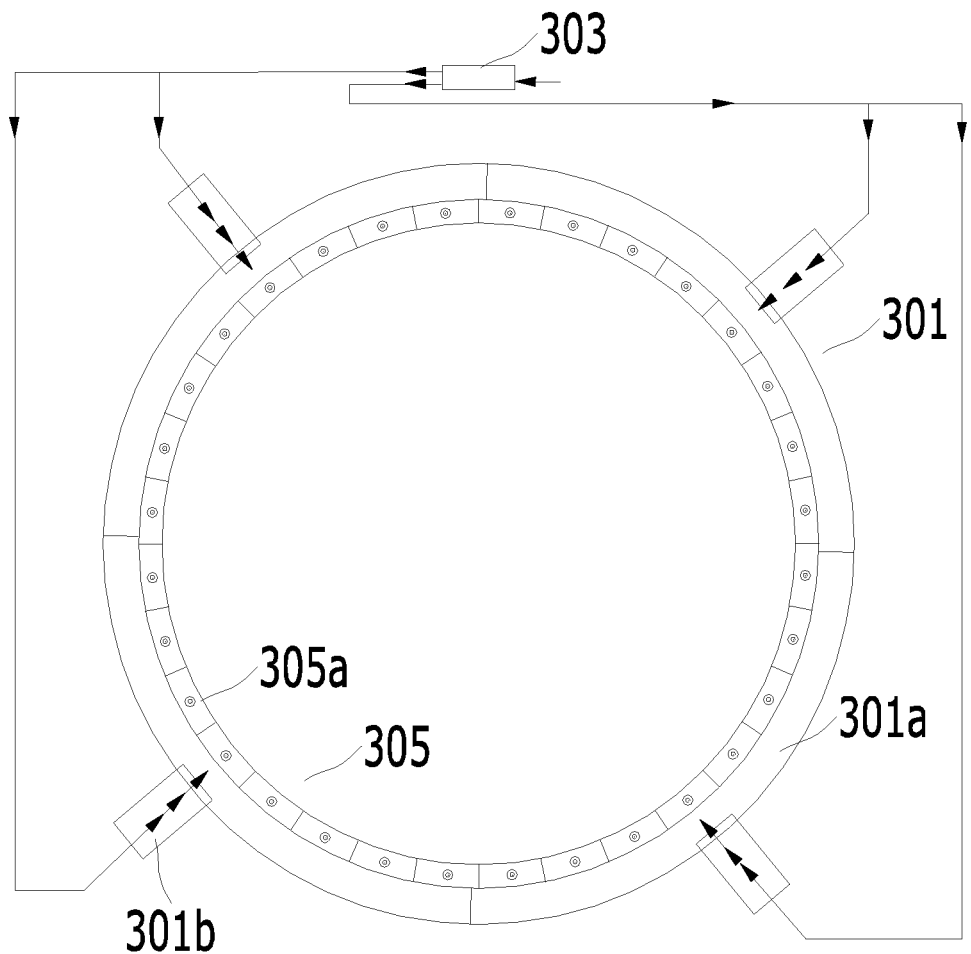
FIG. 9 is a left side view of the annular air distribution chamber in FIG. 5.
Figure 10:
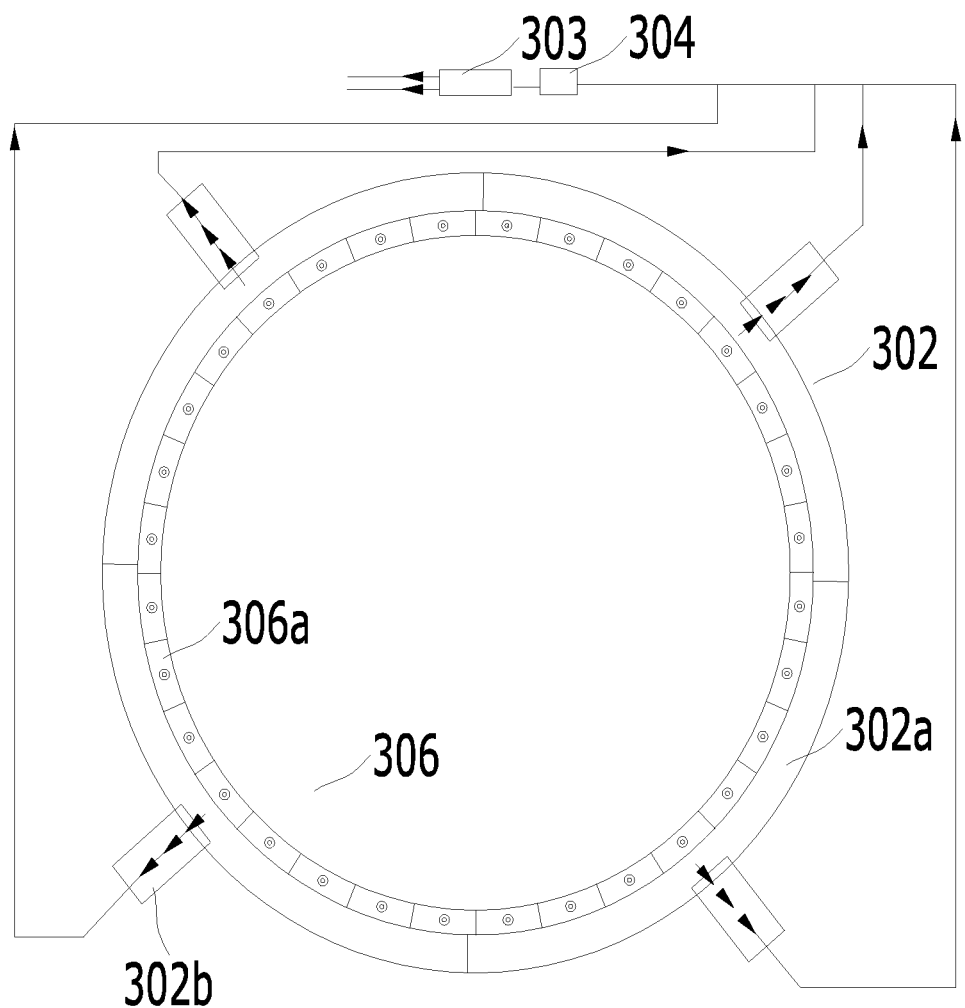
FIG. 10 is a right side view of the annular return flow chamber in FIG. 5.

Referring to FIG. 9 and FIG. 10, FIG. 9 is a left side view of the annular air distribution chamber 301 in FIG. 5; FIG. 10 is a right side view of the annular return flow chamber in FIG. 5.

As shown in FIG. 9, the annular air distribution chamber 301 includes the main body thereof and the air intake nozzle 305. The main body of the annular air distribution chamber 301 is divided into more than two sub air distribution chambers 301a along its circumferential direction, and the air intake nozzle 305 is separated into more than two sub air intake nozzles along the circumferential direction. Each sub air distribution chamber 301a corresponds to one or more sub air intake nozzles 305a. The annular air distribution chamber 301 is divided, and each sub air distribution chamber 301a is provided with an air inlet 301b, so as to ensure the entire ring upward air intake to be relatively uniform. The annular air distribution chamber 301 in FIG. 9 is divided into four sub air distribution chambers 301a, and each sub air distribution chamber 301a is provided with eight sub air intake nozzles 305a. One sub air distribution chamber 301a is equipped with one or more sub air intake nozzles 305a, which may ensure uniform air injection from the sub air intake nozzles 305a and contribute to the speed increase of airflow.

The annular return flow chamber 302 is arranged in the same way as the annular air distribution chamber 301, as shown in FIG. 10, the annular return flow chamber 302 includes the main body thereof and the return flow diffuser pipe 306. The main body of the return flow chamber 302 is divided into more than two sub return flow chambers 302a, and each sub return flow chamber 302a is provided with a return flow interface 302b to discharge airflow. Specifically, it is divided into four sub return flow chambers 302a, and each sub return flow chamber 302a is configured with one or more sub return flow diffuser pipes 306a. Specifically, it is equipped with eight sub return flow diffuser pipes 306a for the purpose of uniform return.

Figure 11:
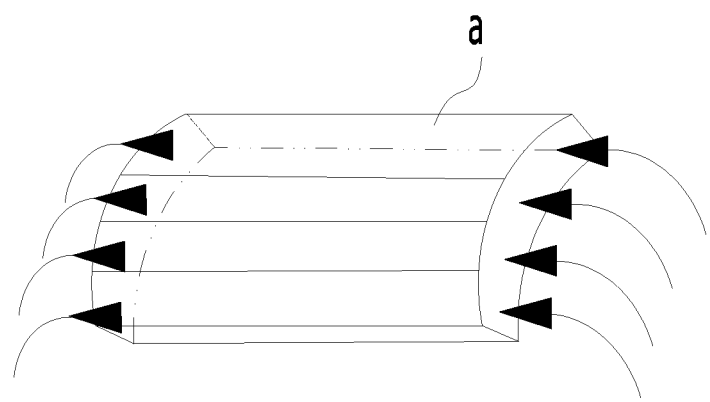
FIG. 11 is a schematic diagram of an air intake nozzle ejecting airflow into an air gap and flowing out.

Referring to FIG. 11, FIG. 11 is a schematic diagram of the air intake nozzle 305 in FIG. 9 ejecting airflow into the air gap a and the airflow flowing out.

As seen from FIG. 11, the air intake nozzle 305 has a cascade structure, and each streamline with an arrow in the figure indicates the flow path in a grid unit of the cascade. When it is set as sub air intake nozzles 305a, and the number thereof is large, the air intake nozzles 305 are in a cascade structure. One cascade unit is one sub air intake nozzle 305a, and the cascade structure forms multiple small nozzles, which may better ensure that the airflow enters the air gap a at the required flow rate.

Similarly, the return flow diffuser pipe 306 may also be a cascade structure. When it is set as sub air return flow diffuser pipes 306a, and the number thereof is large, the return flow diffuser pipes 306 are in a cascade structure. The cascade structure forms multiple small nozzles, which may better ensure that the airflow flows out the air gap a at the required flow rate.

The airflow delivery device in this embodiment further includes a heat exchanger 304, and the cold airflow or hot airflow is formed after heat exchanged by the heat exchanger 304 and delivered to the annular air distribution chamber 301. Specifically, in FIG. 6, the airflow flowing out of the annular return flow chamber 302 exchanges heat with the heat exchanger 304 to form a cold airflow or a hot airflow entering the annular air distribution chamber 301. The heat exchanger 304 may be a partition heat exchanger in the nacelle, and the airflow delivered to the air gap a may be cold airflow for cooling. Then, the cold airflow cools and exchanges heat with the contacted iron core 101 in the air gap a to form a temperature-rising airflow, which is discharged through the annular return flow chamber 302, and then enters the partition heat exchanger to exchange heat again to form a cold airflow, which is delivered to the annular air distribution chamber 301 again.

Of course, the heat exchanger 304 is not limited to the partition heat exchanger, as long as it can exchange heat with the airflow to form the required hot airflow or cold airflow and deliver it to the annular air distribution chamber 301. The airflow of the partition heat exchanger may come from the recovered airflow flowing out of the air gap a, or it may be an external airflow.

The airflow delivery device may also include a blower 303. As shown in FIG. 6, the blower 303 is arranged downstream of the heat exchanger 304 to suck the airflow flowing out of the heat exchanger 304 and enter the annular air distribution chamber 301, so that the airflow entering the annular air distribution chamber 301 has a certain pressure and flow rate, and finally can enter the air gap a more smoothly.

Before the heat exchanger 304 delivers the airflow to the annular air distribution chamber 301 or after the airflow flows out of the air gap a, the airflow may pass through the winding 102 to cool or dry the winding 102 at the same time.

As shown in FIG. 6, the heat exchanger 304 is arranged outside the motor, and the airflow flows out of the heat exchanger 304, passes through the blower 303, and enters the motor housing. First, the airflow passes through the end of the winding 102 at the end of the annular air distribution chamber 301, (instead of entering in disorder, there is a transport pipeline to the annular air distribution chamber 301, which is not shown in the figure, of course, the arrow route may also be regarded as a pipeline) and then enters the annular air distribution chamber 301. In this way, the incoming hot airflow or cold airflow may dry or cool the end of the winding 102.

Looking at one end of the annular return flow chamber 302, the annular return flow chamber 302 is provided with a first outlet d and/or a second outlet e, and the cold airflow or hot airflow may flow out through the first outlet d, and then flow out of the motor through the end of the winding 102 at the end of the motor and enter the heat exchanger 304; the cold airflow or the hot airflow may also directly flow out of the motor through the second outlet e and enter the heat exchanger 304. That is, when the airflow flows out of the air gap a, there can be two circuits, one circuit passes through the end of the winding 102, and the other circuit directly flows out of the motor. The two circuits may be set arbitrarily or together. When the airflow flows out through the first outlet d, the winding 102 at that end may also be dried or cooled. It can be understood that when the airflow flows into the annular air distribution chamber 301, it may also directly enter from the outside or pass through the winding 102 before entering.

With reference to FIG. 6 and FIG. 8, it can be understood that when the airflow passes through the end of the winding 102, the flow direction of the airflow is perpendicular to the direction of the air gap a, so is the outlet position. At this time, the air intake nozzle 305 and the return flow diffuser pipe 306 are arranged in an approximately arc shape so as to reduce the pressure drop of the airflow.

Second Embodiment

Figure 12:
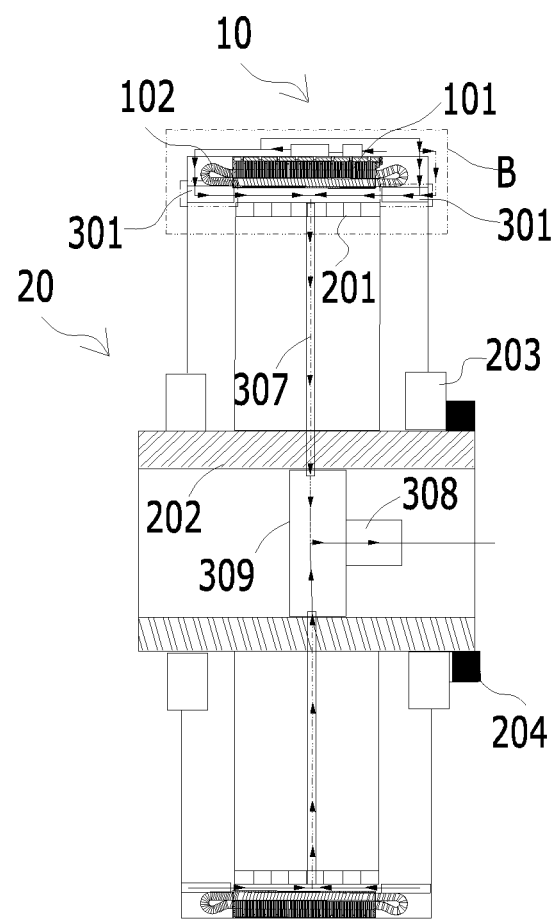
FIG. 12 is a schematic structural diagram of a second embodiment of an inner rotor permanent magnet pole motor provided by the present application.
Figure 13:
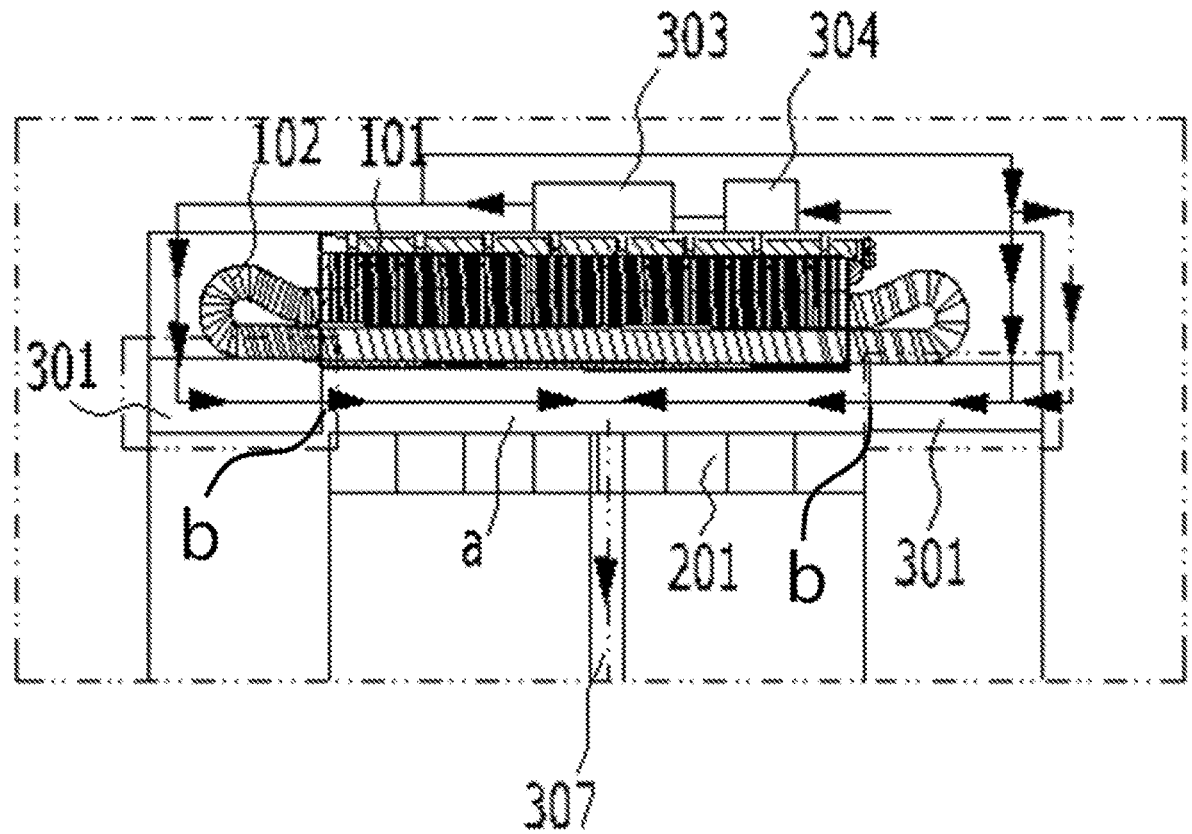
FIG. 13 is a partial enlarged view of part B in FIG. 12.
Figure 14:
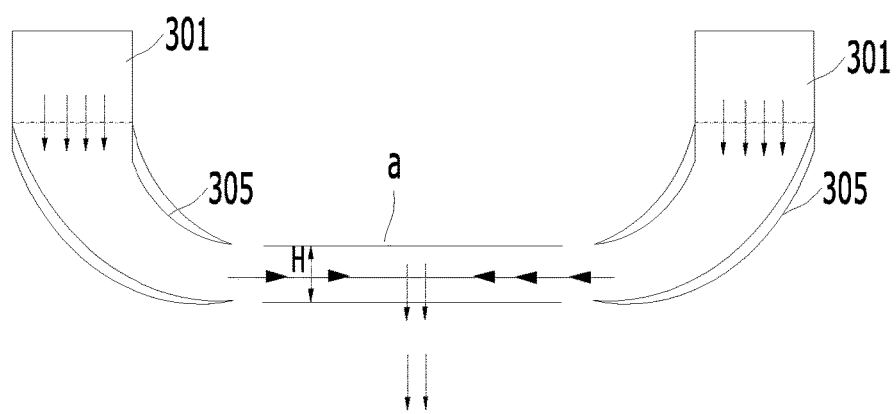
FIG. 14 is a partial view of the annular air distribution chamber and air gap in FIG. 12.

Referring to FIG. 12, FIG. 12 is a schematic structural diagram of a second embodiment of an inner rotor permanent magnet pole motor provided by the present application; FIG. 13 is a partial enlarged view of part B in FIG. 12; FIG. 14 is a partial view of the annular air distribution chamber 301 and air gap a in FIG. 12.

The motor structure of this embodiment is basically same as that of first embodiment. The difference from first embodiment is that the second embodiment does not provide an annular return flow chamber 302, but annular air distribution chambers 301 are respectively provided at both ports of the air gap a. As shown in FIG. 12, both the left and right ends of the air gap a are provided with an annular air distribution chamber 301. In this way, after entering the air gap a through the annular air distribution chamber 301, the airflow flows to the middle of the air gap a. The setting of the annular air distribution chamber 301 is the same as that of the first embodiment, and an air intake nozzle 305 may also be provided.

At this time, in order to facilitate the outflow of airflow, a return flow channel 307 may also be provided. As shown in FIG. 12, the return flow channel 307 is connected to the middle of the air gap a, and hot airflow or cold airflow flows through the annular air distribution chamber 301 to the air gap a, and then flows out of the air gap a from the return flow channel 307 in the middle. The middle here is obviously not limited to the middle position.

Specifically, the return flow channel 307 is provided in the rotor 20 and the rotating shaft 202 of the motor. The return flow channel 307 penetrates the side wall of the rotating shaft 202 and the rotor 20 to communicate the inner cavity of the rotating shaft 202 and the middle of the air gap a. In this way, the cold airflow or hot airflow respectively entering the air gap a from the two ports flows to the return flow channel 307 and enters an inner cavity of the rotating shaft 202, which is convenient for recycling. In order to ensure the airflow in the annular air gap a to flow back relatively uniformly and rapidly, multiple of the above-mentioned return flow channels 307 may be provided, and the return flow channels 307 are evenly distributed along the circumferential direction of the rotor 20. The annular air distribution chamber 301 in this embodiment may also be the same as that in the first embodiment, using a separate arrangement. At this time, the position of the return flow channel 307 may correspond to the positions of the multiple sub air distribution chambers 301a.

Figure 15:
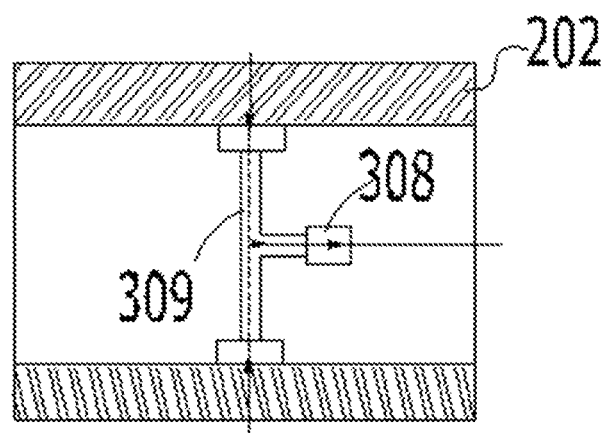
FIG. 15 is a schematic diagram of the recovery part in the rotating shaft in FIG. 12.

As shown in FIG. 15, FIG. 15 is a schematic diagram of a recovery part in the rotating shaft 202 in FIG. 12.

The recovery part includes a confluence chamber 309 located in the inner cavity of the rotating shaft 202. The airflows in each return flow channel 307 converge into the confluence chamber 309, and are induced from the inner cavity of the rotating shaft 202, which may be recycled for reuse. In this embodiment, the recovery part further includes an induced draft fan 308, which sucks the confluence chamber 309 and is beneficial for the airflow in the air gap a to flow to the return flow channel 307. Of course, the return flow channel is not limited to being provided on the rotor 20, as long as it can draw out the airflow in the air gap a, for example, it penetrates the stator.

The airflow delivery device in this embodiment may also include a heat exchanger 304 and a blower 303 to deliver air to the annular air distribution chambers 301 at both ends. At this time, the airflow flow out of the return flow channel 307 may flow back to the heat exchanger 304 again. When the airflow entering the air gap a is a cold airflow, the heated airflow may also be used as a dry hot airflow without returning to the heat exchanger 304. The intake airflow of the heat exchanger 304 may come from the outside of the motor or the outside of the entire unit.

Third Embodiment

Figure 16:
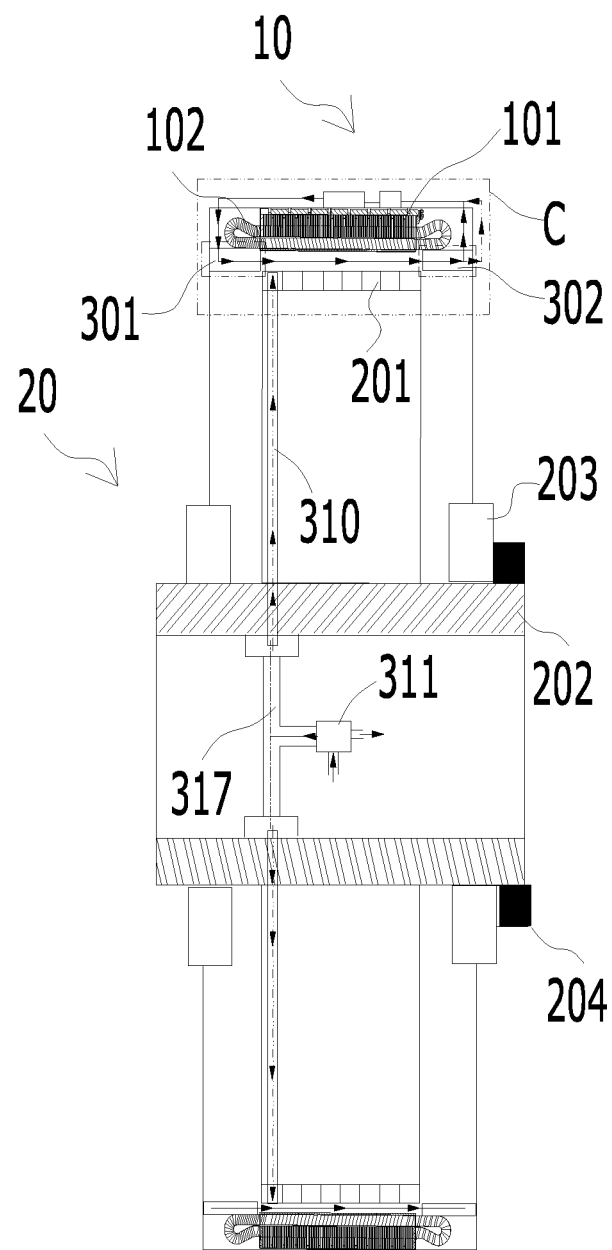
FIG. 16 is a schematic structural diagram of a third embodiment of an inner rotor permanent magnet pole motor provided by the present application.
Figure 17:
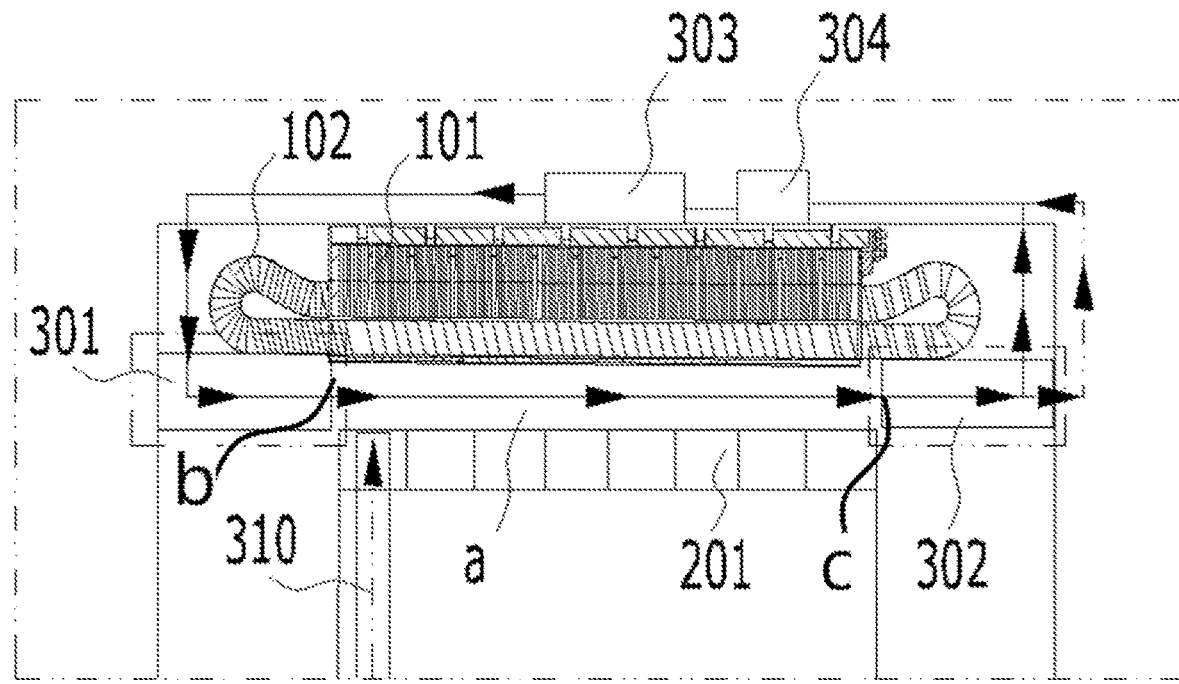
FIG. 17 is a partial enlarged view of part C in FIG. 16.
Figure 18:
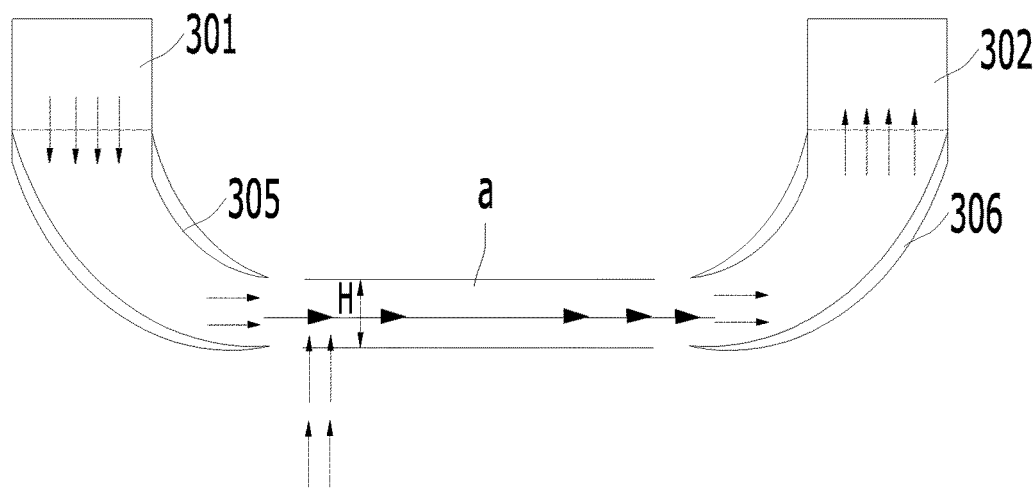
FIG. 18 is a partial view of the annular air distribution chamber, air gap and annular return flow chamber in FIG. 16.

Referring to FIG. 16, FIG. 16 is a schematic structural diagram of a third embodiment of an inner rotor permanent magnet pole motor provided by the present application; FIG. 17 is a partial enlarged view of part C in FIG. 16; FIG. 18 is a partial view of the annular air distribution chamber 301, air gap a and annular return flow chamber 302 in FIG. 16.

This embodiment is basically same as first embodiment, except that on the basis of first embodiment, the airflow delivery device further includes a vortex separator 311 to generate cold airflow or hot airflow and deliver it to the air gap a. The principle of the vortex separator 311 generating cold airflow and hot airflow will be described in detail below.

Figure 19:
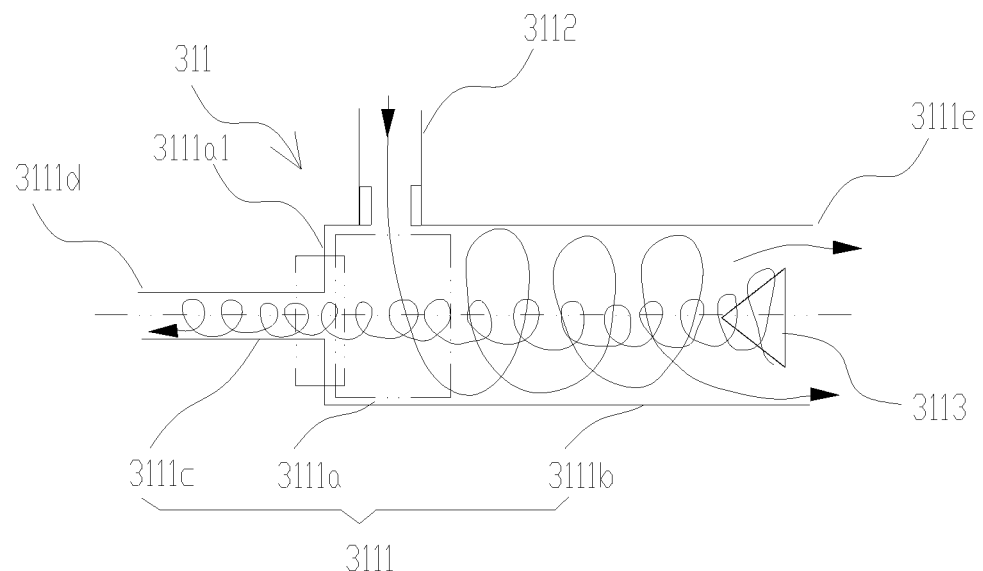
FIG. 19 is the basic structure of vortex separator in FIG. 16 and the working principle diagram of total temperature separation of airflow.
Figure 20:
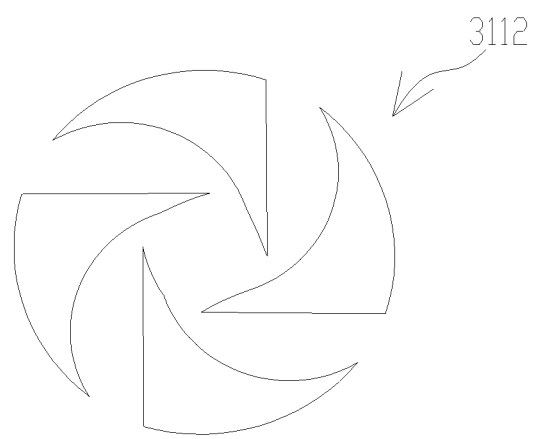
FIG. 20 is a cross-sectional view of the flow channel of the nozzle in FIG. 19.

As shown in FIG. 19 and FIG. 20, FIG. 19 is the basic structure of the vortex separator 311 in FIG. 16 and the working principle diagram of total temperature separation of airflow; FIG. 20 is a cross-sectional view of the flow channel of the nozzle 3112 in FIG. 19.

In FIG. 19, the vortex separator 311, which may be used as a cold source or a heat source, including a nozzle 3112 and a vortex separation tube 3111. The nozzle 3112 is communicated with a side wall of the vortex separation tube 3111, and the inner cavity of the vortex separation tube 3111 and the portion directly opposite to the nozzle 3112 form a vortex chamber 3111a. One end (the left end in FIG. 19) of the vortex chamber 3111a is a cold end pipe section 3111c, and the other end (the right end in FIG. 19) of the vortex chamber 3111a is a hot end pipe section 3111b. The outlet of the cold end pipe section 3111c is a cold end 3111d that outputs cold airflow, and the outlet of the hot end pipe section 3111b is the hot end 3111e that outputs hot airflow. One end plate 3111a1 of the vortex chamber 3111a defines a through hole, which is defined here as a cold end orifice plate, and the cold end pipe section 3111c communicates with the through hole. As shown in FIG. 19, the cold end pipe section 3111c is a relatively thin pipe section with a smaller cross-sectional area than the vortex chamber 3111a. The vortex chamber 3111a and the hot end pipe section 3111b are equal-diameter pipe sections, which may be arranged integrally or separately, and the integrated arrangement is simpler.

The nozzle 3112 of the vortex separator 311 that carries the cold source and the heat source is an energy conversion component that converts the pressure energy of the compressed air into the kinetic energy carried by the high-speed airflow. The nozzle 3112 may include an inlet section, a main body section, and an outlet section, and the outlet section is provided with a jet to eject airflow. The airflow may form spiral airflow after passing through the nozzle 3112. As shown in FIG. 20, the nozzle 3112 is internally provided with a swirl plate, that is, the outlet section of the nozzle 3112 is a volute, and the airflow may form spiral airflow after entering the nozzle 3112. The nozzle 3112 requires communication with the vortex chamber 3111a in a tangential direction, that is, the spiral airflow ejected from the nozzle rotates into the vortex separation tube 3111 along the tangential direction of the vortex separation tube 3111. The volute may evenly distribute the airflow to the jet at the outlet section of the nozzle 3112, reduce the energy loss as much as possible, and ensure that the airflow on the inner circle of the volute is axisymmetric.

As the cross-sectional area of the cold end pipe section 3111c is small, the resistance at the orifice plate of the cold end 3111d is relatively large for the spiral airflow entering the vortex chamber 3111a, and the airflow tangentially swirling into the vortex separation tube 3111 flows to the opposite hot end pipe section 3111b. Herein, the cross-sectional area of the hot end pipe section 3111b may be equal to or larger than the cross-sectional area of the vortex chamber 3111a, so as to ensure the spiral airflow to flow in the direction of the hot end pipe section 3111b.

A valve with a tapered surface is also provided in the hot end pipe section 3111b, for example, a tapered throttle piece 3113 as shown in FIG. 19. The direction of the tapered end of the throttle piece 3113 is opposite to the flow direction of the spiral airflow. In FIG. 19, the spiral airflow enters the vortex separation tube 3111 from the nozzle 3112 and flows spirally from left to right. When the spiral airflow flowing to the throttle piece 3113, the external airflow of the spiral airflow may flow out from the valve, that is, flow out along the annular gap between the throttle piece 3113 and the vortex separation tube 3111 and heat up into a hot airflow. As shown in FIG. 19, the hot airflow flows out from the hot end 3111e of the hot end pipe section 3111b.

However, the middle airflow of the spiral airflow may encounter the throttle piece 3113, and after colliding and being guided with the tapered surface of the throttling piece 3113, the middle airflow may swirl in the opposite direction to form a return airflow. During the flowing process, it may gradually cool down, and the temperature of the cooling airflow may be greatly reduced to −50-10 degrees Celsius. The external airflow and the middle airflow mentioned here are relative to the center line of spiral airflow, and the spiral airflow near the center line is the middle airflow, while the airflow far away from the center line and near the radial outermost side of the spiral airflow is the external airflow. In order to ensure the flow of the spiral airflow to the hot end pipe section 3111b and the return stroke for forming the hot airflow and the cold airflow, the throttle piece 3113 may be provided at the end of the hot end pipe section 3111b.

It is required that the spiral airflow may form a reverse spiral airflow after passing through the valve, so the tapered throttle piece 3113 is provided. In terms of the formation of the swirling spiral airflow, the valve only needs to have a conical surface with a certain degree. For example, it is a truncated cone shape (that is, there is no cone tip, but a tapered section), or a half cone that is cut along the axial direction. However, it can be understood that, in order to better form the choking effect and guide the return spiral airflow, the preferred solution is to set the valve in a complete cone as shown in FIG. 19. Moreover, the axis of the tapered throttle piece 3113 coincides with the axis of the cold end pipe section 3111c, and the spiral airflow in the return flow rotates to the cold end pipe section 3111c, which is beneficial to the swirling of the airflow and reduces energy loss.

It can be seen that the vortex separator 311 carrying the cold source of the electromagnetic device iron core 101 may produce the separation effect of separating the temperature of the same airflow, and obtain two airflows of cold airflow and hot airflow, and the two airflows have very different temperature levels. The vortex separator 311 is developed based on the tornado phenomenon.

Tornado is a strong cyclone that occurs in nature under certain atmospheric conditions. Under certain conditions, ocean vortices that propagate vertically from the water surface to the seabed may also be produced in the ocean. The airflow structure of a typical tornado shows that the center of the tornado is a funnel-shaped or trumpet-shaped sharp cone. This cone is the swirling zone of the tornado, and the rotation of the cone is the same as that of the dust-filled ascending hot airflow. However, the axial flow direction of the airflow in the central cone is opposite to the peripheral ascending airflow, showing a descending airflow. In the natural environment, the descending velocity of cold airflow in the center cone of a tornado can be tracked and measured and it may be up to 17 m/s. Once the cone tip of the central cone reaches divergence, the tornado may intensify rapidly, and the cone tip disappears and becomes a truncated cone. When the outer hot airflow rotates while ascending and reaches the bottom surface of the upper cold cloud layer or the stratosphere, it may immediately show a bell-mouthed horizontal spinning divergence and change the direction of rotation to throw out in the opposite direction. The air rotates rapidly around the axis of the tornado. Attracted by the extreme reduction of air pressure at the center of the tornado, the airflow is sucked into the bottom of the vortex from all directions in the thin layer of air with a thickness of tens of meters near the ground, and randomly turns into a vortex rotating upward at high speed around the axis. Therefore, the wind in the tornado is always cyclonic, and the air pressure at its center is 10% lower than the surrounding air pressure, generally as low as 400 hPa. The lowest can reach 200 hPa. Tornadoes have a great sucking effect. They can suck sea water or lake water away from the sea or lake surface, forming a water column, and then connecting with the cloud, commonly known as "dragon drawing water".

The energy sources of tornado: one is the heat energy of the airflow around the tornado, and another is the vacuum energy in the low pressure area of the vortex center. The high-temperature air in the surrounding airflow of the tornado interacts with the tornado, which converts thermal energy into rotational kinetic energy. The mechanism is explained by Crocco's theorem. Crocco's theorem is based on the first law of thermodynamics of energy conservation in fluid vortex field. This theorem quantitatively expresses the relationship between the gradient of thermodynamic enthalpy, the gradient of entropy in the vortex field and vortex rotation intensity. The temperature difference and convection in the atmosphere are the preconditions for the formation of tornado vortex, and the energy to enhance tornado vortex comes from the surrounding heat energy. The gradient of thermodynamic enthalpy formed by the ascending hot airflow at the periphery of the tornado and the descending cold airflow at the center of the vortex becomes a key factor for the conversion of atmospheric heat energy into the kinetic energy of the vortex flow. After the tornado reaches a certain intensity by heat energy, the further strengthening needs to rely on the vacuum energy in the low pressure area of vortex center. The lower cone at the center of the tornado rotates in the same direction as the surrounding airflow. The airflow in the cone rotates down while gathering toward the center. When the centripetal acceleration exceeds a certain critical value, the radial concentration process may accelerate the rotation of the radial peripheral airflow through the viscous diffusion under the action of Coriolis force.

That is, the tornado has the phenomenon of total temperature separation. The vortex separator 311 provided in this embodiment is analogous to the tornado, and the nozzle 3112 is provided to form the incoming compressed airflow into a spiral airflow, which may be regarded as a spiral flow of a small-scale tornado. In this way, the total temperature separation of the tornado may be simulated in the vortex separation tube 3111, and then the required hot airflow and cold airflow can be formed.

The above is to trace the mechanism of this scheme from nature, and the principle of the temperature separation effect of the vortex separator 311 will be explained below.

Figure 21:
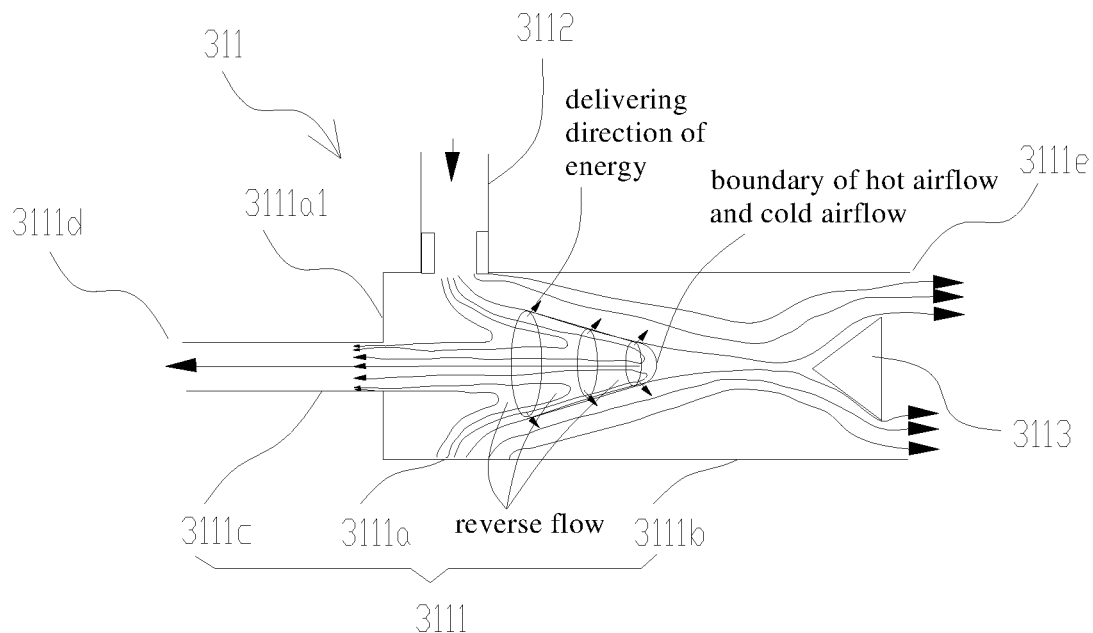
FIG. 21 is a schematic diagram of the internal flow field and heat energy transfer in the vortex separator in FIG. 19.
Figure 22:
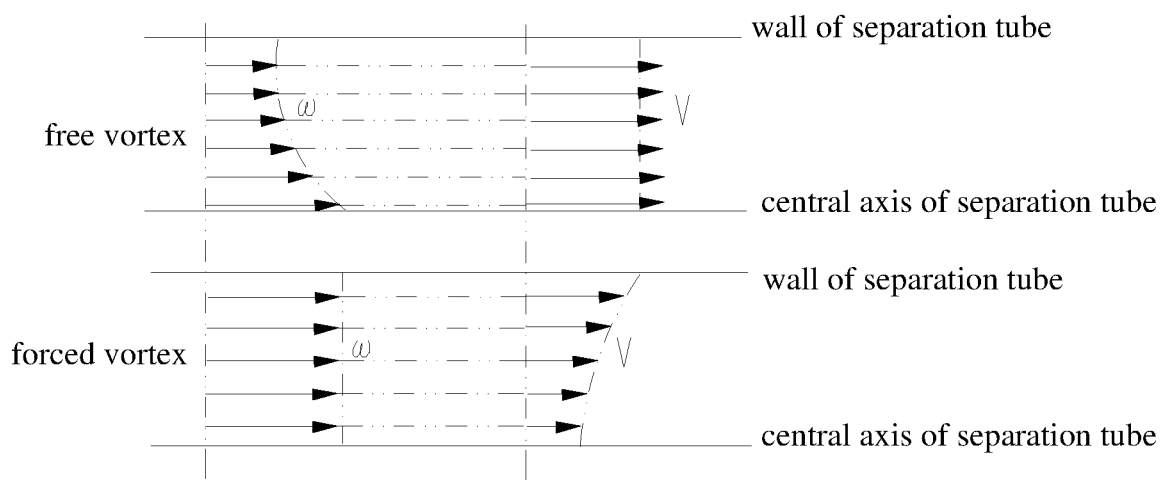
FIG. 22 is a comparison diagram of free vortex and forced vortex.

Referring to FIG. 21 and FIG. 22, FIG. 21 is a schematic diagram of the internal flow field and heat energy transfer in the vortex separator in FIG. 19; FIG. 22 is a comparison diagram of free vortex and forced vortex.

According to the law of conservation of energy, the total energy of cold airflow and hot airflow flowing out of vortex separator 311 should be equal to the energy of compressed air that entering nozzle 3112 of vortex separator 311 (provided that vortex separator 311 is well insulated). Therefore, there must be a process of energy redistribution in the vortex separator 311, so that a part of the energy is transferred from the cooling airflow to the hot airflow.

First, compressed air is supplied to the nozzle 3112, and then becomes high-pressure air. A compressor may be provided, and compressed air may be supplied by the compressor. In order to prevent the supplied cooling airflow from affecting the internal environment of the iron core 101, an air filter may be provided at an inlet of the compressor.

The flow of compressed air expands and accelerates in the nozzle 3112 of the vortex separator 311, and the speed may approach the speed of sound when entering the vortex chamber 3111a of the vortex separator 311. If the scaled nozzle 3112 is used, the speed may exceed the speed of sound. Since the airflow rapidly expands through the nozzle 3112, it can be approximated as an adiabatic process. The flow velocity of the airflow at the outlet jet of the nozzle 3112 is very large, and the corresponding thermodynamic temperature will be much lower than the temperature at the inlet of the nozzle 3112, that is, after one controllable cooling.

When the airflow tangentially enters the vortex chamber 3111a of the vortex separation tube 3111, it may continue to spiral along the inner wall of the vortex chamber 3111a, forming a high-speed rotating airflow. When the airflow just exits from the nozzle 3112, there is V=const or ω■r=const, where V is the tangential velocity of the airflow and ω is the angular velocity. This kind of rotation is also called free vortex, as shown in FIG. 12, which shows the difference between the tangential velocity and angular velocity of free vortex and forced vortex. At this time, the trajectory of the airflow in the vortex chamber may be regarded as moving along the Archimedes spiral. The formation process of cooling airflow and hot airflow is analyzed below.

The formation of the hot airflow: as the flow of the airflow just leaving the nozzle 3112 is a free vortex, the angular velocity has a gradient along the radial direction, which causes friction between the radial layers of the airflow, and then the angular velocity of the external airflow of the spiral airflow gradually increases, while the angular velocity of the middle airflow of the spiral airflow gradually decreases. However, due to the fast flow and the short distance, the spiral airflow has not yet reached the complete forced vortex, but has developed towards the center part. The external airflow of the spiral airflow will move along a spiral in the hot end pipe section 3111*b*, which has both rotational movement and axial movement. During the movement, the external airflow rubs against the inner wall of the hot end pipe section 3111*b*, the velocity of the external airflow becomes lower and lower, the temperature is gradually increased, and finally flows out from the annular gap between the throttle piece 3113 and the hot end pipe section 3111*b*. By adjusting the gap between the throttle piece 3113 and the hot end pipe section 3111*b*, the ratio of cold and hot airflows may be adjusted.

The formation of the cold airflow: the airflow just existing the nozzle 3112 is a free vortex, which is blocked by the orifice plate of the cold end 3111*d* of the cold end pipe section 3111*c* under the action of centrifugal force, and the airflow may flow close to the inner wall of the hot end pipe section 3111*b* to the throttle piece 3113. In the flow process, due to the gradual dissipation of the axial velocity, the axial velocity of the swirling flow is close to zero when it moves to a certain position in the axial direction, which may be defined as stagnation point. At this time, due to the accumulation of the middle airflow at the stagnation point, the pressure rises continuously, and the pressure at the stagnation point will be higher than the pressure at the cold end 3111*d* at the outlet of the cold end pipe section 3111*c*, which will produce reverse axial movement in the central area of the hot end pipe section 3111*b*. That is, the return airflow starts from the stagnation point, and the temperature is gradually reduced to form a cold airflow, that is, secondary cooling. At the stagnation point, the total temperature of the external airflow is higher than the total temperature of the middle airflow. When this reverse flow moves toward the cold end pipe section 3111*c*, part of the spiral airflow in the outer layer is continuously turned and converged, thus gradually expanding, and its reverse flow reaches the maximum when it reaches the orifice plate of the cold end 3111*d*.

As shown in FIG. 21, on the same channel section of the vortex separation tube 3111, the static pressure of the outermost layer of external airflow is the largest, while the static pressure of the middle airflow located on the central axis is the smallest. On the section near the jet of the nozzle 3112, the ratio of the maximum static pressure to the minimum static pressure is the largest, which may reach 1.5-2. The static temperature is the highest on the wall of the vortex separation tube 3111 and the lowest on the central axis.

On any flow channel section, the tangential velocity of the airflow at any point is dominant. In the vicinity of the jet of the nozzle 3112, the radial velocity and the axial velocity of the airflow both reach their maximum values, and gradually decrease in their respective directions.

As mentioned above, after leaving the jet, the airflow enters the vortex separation tube 3111 along the tangential direction and is divided into two regions. The external airflow rotates tangentially along the inner wall of the vortex separation tube 3111 and tends to the outlet of the hot end 3111*e* of the hot end pipe section 3111*b*, that is, the external airflow in the outer region forms a free vortex. The middle airflow flows back from the position where the throttle piece 3113 is arranged, and is driven by the surrounding free vortex. After friction, the inner region (middle airflow) where the airflow rotates like a rigid body may be transformed into or close to the forced vortex.

The boundary between the outer and middle regions, i.e., the outer airflow and the return flow middle airflow, depends on the cold flow rate. FIG. 21 shows the boundary between the cold and hot airflows. In the entire length of the vortex separation tube 3111, the boundary interface is generally within a range of 0.65-0.75 R from the central axis, that is, the flow range of the central airflow in the radial direction. R is the radius of the vortex separation tube 3111. The axial flow of the external airflow from the jet of the nozzle 3112 to the throttle piece 3113 is carried out in the range of 0.65-1 R, that is, the flow range of the external airflow in the radial direction. In the inner area, the middle airflow flows in the opposite direction, and the flow starts at the throttle piece 3113.

The central airflow temperature of the middle airflow is the highest at the throttle piece 3113, gradually decreases in reverse flow, and is the lowest when it reaches the cold end 3111*d* orifice. The maximum temperature difference occurs in the central axis direction, the highest temperature is at the central axis corresponding to the throttle piece 3113, and the lowest temperature is at the central axis corresponding to the orifice plate of the cold end 3111*d*. For the middle airflow of the inner layer, that is, the cold airflow, its static temperature is the lowest at the central axis and the highest at the interface with the outer airflow.

On any cross section of the flow channel of the vortex separation tube 3111, the total temperature is highest near the inner wall surface of the vortex separation tube 3111 and lowest on the central axis. At the cross section of the flow channel at the jet, the difference between the wall temperature and the central axis temperature of the vortex separation tube 3111 reaches the maximum.

Figure 23:
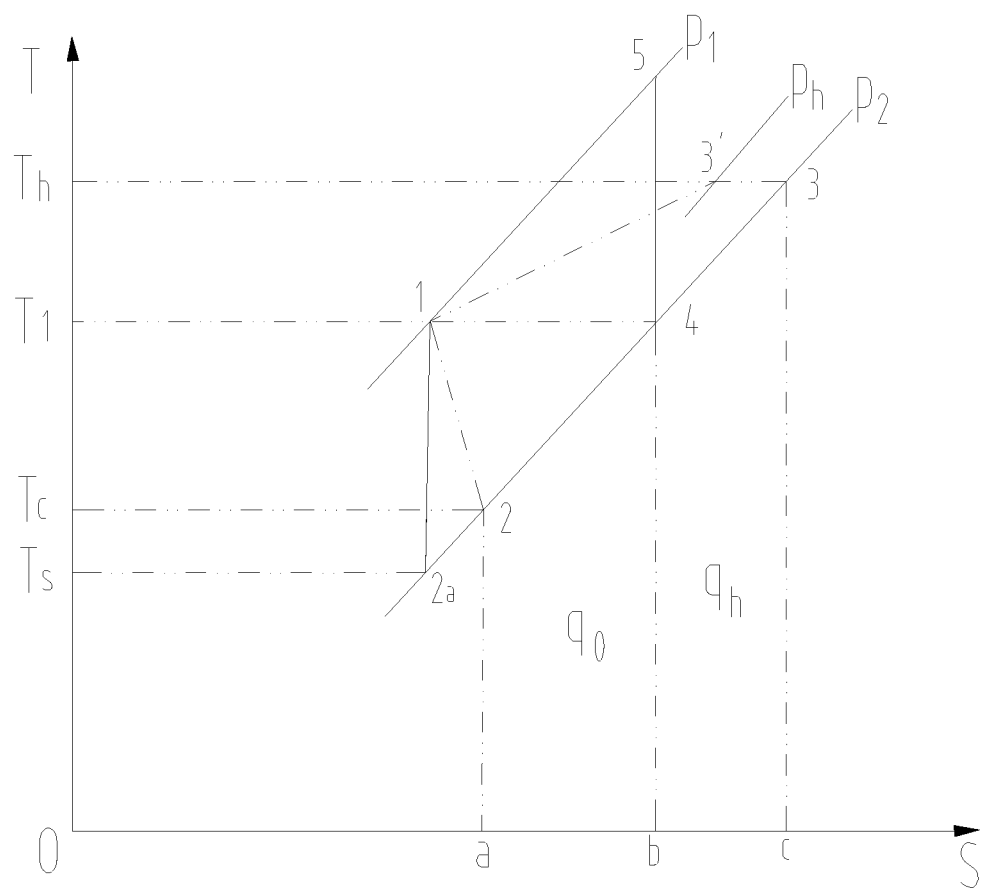
FIG. 23 is a schematic diagram of the total temperature separation in the vortex separator in FIG. 19 based on thermodynamic temperature-entropy (T-S)

For the total temperature separation effect of the vortex separator 311, reference may be made to FIG. 23. FIG. 23 is a schematic diagram of the total temperature separation in the vortex separator in FIG. 19 based on the thermodynamic temperature-entropy (T-S). Tt can be seen from FIG. 23 that the vortex separator 311 does temperature-separate the compressed airflow entering the nozzle 3112.

In FIG. 23, point 4 is the state before air compression, that is, the state before entering the compressor. Point 4-5 is the isentropic compression process of airflow. Point 5-1 is the isobaric cooling process of compressed air. Point 1 represents the state before the compressed air enters the nozzle 3112 of the vortex separator 311. Under ideal conditions, it adiabatically expands to the $P_2$ pressure, and the temperature drops to $T_s$, that is, the state at point 2*a*. Point 2 is the state of the cold airflow out of the vortex tube, and its temperature is $T_c$. Point 3 is the separated hot airflow state, and its temperature is $T_h$. Points 1-2 and 1-3 are the separation process of cold and hot airflow. 3-3' is the throttling process of the hot air passing through the throttling piece 3113, and the specific enthalpy value remains unchanged before and after throttling.

During the whole working process, it is impossible for the airflow to expand isentropically in the nozzle 3112. There is a certain loss of kinetic energy exchange between the air inside and outside the vortex chamber 3111*a*, and there is a heat transfer process to the center in the vortex chamber 3111*a*, which makes the airflow deviate from the adiabatic expansion process at point 1-2. As a result, the temperature $T_c$ of the cold airflow separated by the vortex separation tube 3111 is always higher than the temperature $T_s$ of the cold airflow under adiabatic expansion.

Please refer to the cooling effect and heating effect of vortex separator 311 in the above embodiment.

The vortex separation tube 3111 separates the air at the temperature $T_1$ into the cold airflow at the temperature $T_c$ and the hot airflow at the temperature $T_h$ during the working process. Therefore, $\Delta T_c = T_1 - T_c$ is called the cooling effect of the vortex separation tube 3111. $\Delta T_h=T_h-T_1$ is called the heating effect of the vortex separation tube 3111. $\Delta T_s=T_1-T_s$ is defined as isentropic expansion effect to mark the theoretical cooling effect of vortex separation tube 3111. Therefore, the effectiveness of the refrigeration of the vortex separation tube 3111 is expressed by the cooling efficiency $\eta^c$, namely:

$$\eta_c = \frac{\Delta T_c}{\Delta T_s} = \frac{T_1 - T_c}{T_1\left[1 - \left(\frac{p_2}{p_1}\right)^{\frac{k-1}{k}}\right]}$$

where, $p_1$—inlet airflow pressure of vortex separator 311; $p_2$—the pressure after the airflow expands in the nozzle 3112 into the vortex chamber 3111a; k—adiabatic index of gas (such as air).

In addition, during the operation of the vortex separator 311, there is a balance of flow and heat, as follows.

If $q_{m1}$, $q_{mc}$, $q_{mh}$ represent the flow rates of the high-speed airflow entering the vortex separation tube 3111, the cold airflow at the cold end 3111d, and the hot airflow at the hot end 3111e, respectively, $q_{m1}=q_{mc}+q_{mh}$.

If $h_1$, $h_c$ and $h_h$ (KJ/Kg) represent their specific enthalpy, respectively, ignoring the kinetic energy when the gas flows out, $q_{m1}h_1=q_{mc}h_c+q_{mh}h_h$.

$$\mu_c = \frac{q_{mc}}{q_{m1}} = \frac{q_{mc}}{q_{mc}+q_{mh}}$$

Air-conditioning flow ratio:
Corresponding relationship between gas enthalpy and temperature:

$$h=C_pT$$

Get: $T_1=\mu_cT_c+(1-\mu_c)T_hT$ $$\mu = \frac{T_h - T_1}{T_h - T_c} = \frac{\Delta T_h}{\Delta T_h + \Delta T_c}$$

The refrigerating capacity of the vortex separation tube 3111 may also be obtained, as follows.

The refrigerating capacity $Q_0$(kW) of the vortex separation tube 3111 is:

$$Q_0=q_{mc}c_p(T_1-T_c)=\mu_c q_{m1}c_p\Delta T_c$$

Then the refrigerating capacity per kilogram of cold airflow is:

$$q_o = \frac{Q_0}{q_{mc}} = c_p\Delta T_c$$

If for each kilogram of high-pressure gas, its unit refrigerating capacity $q'_0$ may be expressed as:

$$q'_0 = \frac{Q_0}{q_{m1}} = \mu_c c_p\Delta T_c = \mu_c q_0$$

Please refer to the heating capacity of vortex separation tube 3111 $Q_h$(kW):

$$Q_h=q_{mh}c_p(T_h-T_1)=(1-\mu_c)q_{m1}c_p\Delta T_h$$

The heating capacity per kilo of hot airflow is:

$$q_h = \frac{Q_h}{q_{mh}} = c_p\Delta T_h$$

If for each kilogram of high-pressure gas, its unit heating $$q'_h = \frac{Q_h}{q_{m1}} = (1-\mu_c)c_p\Delta T_h$$

capacity can be expressed as:

The cooling effect $\Delta T_c=T_1-T_c$ and the unit cooling capacity $q_0$ of the vortex separation tube 3111 are related to the following factors, namely, the cold airflow component $\mu_c$, the inlet working pressure $p_1$ of the nozzle 3112, and the water vapor content in the airflow.

When the value of the cold airflow component $\mu_c$ changes, both $\Delta T_c$ and $q_o$ change correspondingly, and the maximum value exists in the range of $\mu_c=0\sim1$. When $\mu_c=0.3\sim0.35$, $\Delta T_c$ has the maximum value; when $\mu_c=0.6\sim0.7$, $q_o$ reaches its maximum value. Meanwhile, the heating effect also changes with the change of $\mu_c$, when $\mu_c$ increases, $\Delta T_h$ increases continuously, and there is no limit.

The inlet working pressure of the nozzle 3112 is $p_1$, when $p_1$ increases, both $\Delta T_c$ and $q_o$ increase. However, when increasing, the maximum value of $\Delta T_c$ moves in the direction where B decreases, and the maximum value of $q_o$ moves in the direction where $\mu_c$ increases.

When the gas is humid, the water vapor in the cold airflow may condense and release heat, so the cooling temperature rises and the cooling efficiency decreases. The temperature rise of hot airflow decreases and the heating efficiency decreases.

The principle of vortex separator 311 is described in detail above, which may separate hot airflow and cold airflow, and then both cold airflow and hot airflow can be delivered to annular distribution chamber 301 for cooling and drying. The structure is simple, energy-saving, and easy to form the required airflow for cooling or drying.

As shown in FIG. 16, the hot airflow or cold airflow generated by the vortex separator 311 is communicated to one end of the air gap a. Specifically, a delivery flow channel 310 may be provided. Similar to the above setting of the return flow channel 307, the delivery flow channel 310 also penetrates the side wall of the rotating shaft 202 and the rotor 20 to communicate the inner cavity of the rotating shaft 202 and the air gap a. The cold airflow or hot airflow generated by the vortex separator 311 is delivered to the inner cavity of the rotating shaft 202, and can enter the delivery flow channel 310, and then be delivered to the air gap a.

The delivery flow channel 310 is provided on the rotor 20 and the rotating shaft 202, which is convenient for setting the vortex separator 311. It is particularly important that when the rotating shaft 202 and the rotor 20 rotate, under the action of centrifugal force, the cold airflow or hot airflow generated by the vortex separator 311 may automatically enter the delivery flow channel 310, thereby entering the air gap a for cooling or drying.

As shown in FIG. 16, the rotating shaft 202 is provided with a confluence delivery chamber 317 therein, and there may be multiple delivery flow channels 310, and the multiple delivery channels 310 are connected to the confluence delivery chamber 317, thereby increasing the transport uniformity of the delivery channel 310 to the air gap a. The cold end pipe section 3111c or the hot end pipe section 3111b of the vortex separation tube 3111 may be connected to the confluence delivery chamber 317 through a gas slip ring. Or, the cold end pipe section 3111c and the hot end pipe section 3111b of the vortex separator 311 directly spray into the inner cavity of the rotating shaft 202, and the airflow may also enter the delivery flow channel 310. The vortex separator 311 shown in the inner cavity of the rotating shaft 202 in FIG. 16 is only a schematic illustration. The main body of the vortex separator 311 is not arranged in the rotating shaft 202, which prevents the vortex separator 311 from rotating with the rotating shaft 202. Of course, for a small vortex separator 311, rotation is also feasible.

Fourth Embodiment

Figure 24:
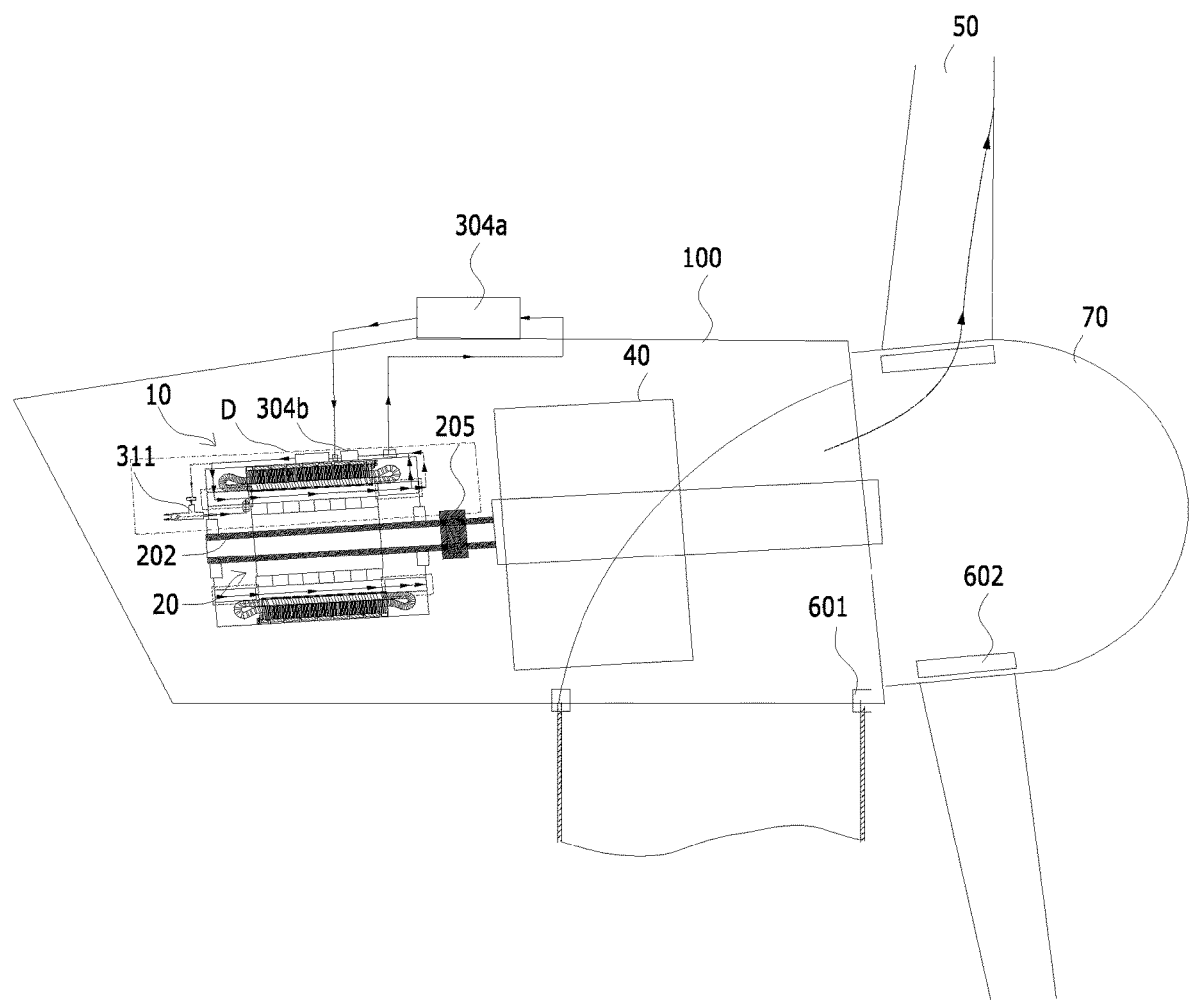
FIG. 24 is a schematic structural diagram of a fourth embodiment of an inner rotor permanent magnet pole motor provided by the present application, the position of the motor in the wind power generation unit is shown.
Figure 25:
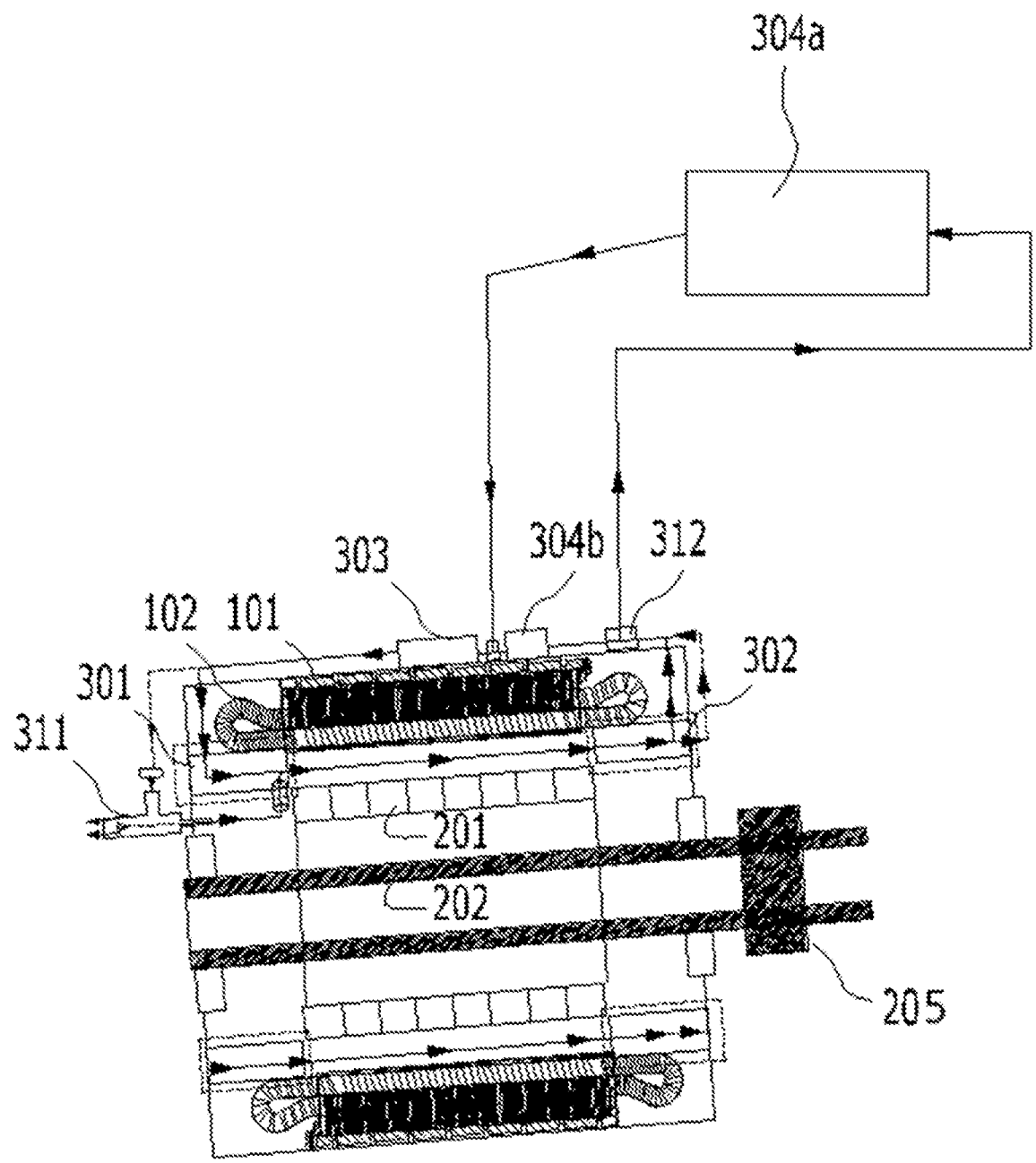
FIG. 25 is a schematic diagram of the motor in FIG. 24.
Figure 26:
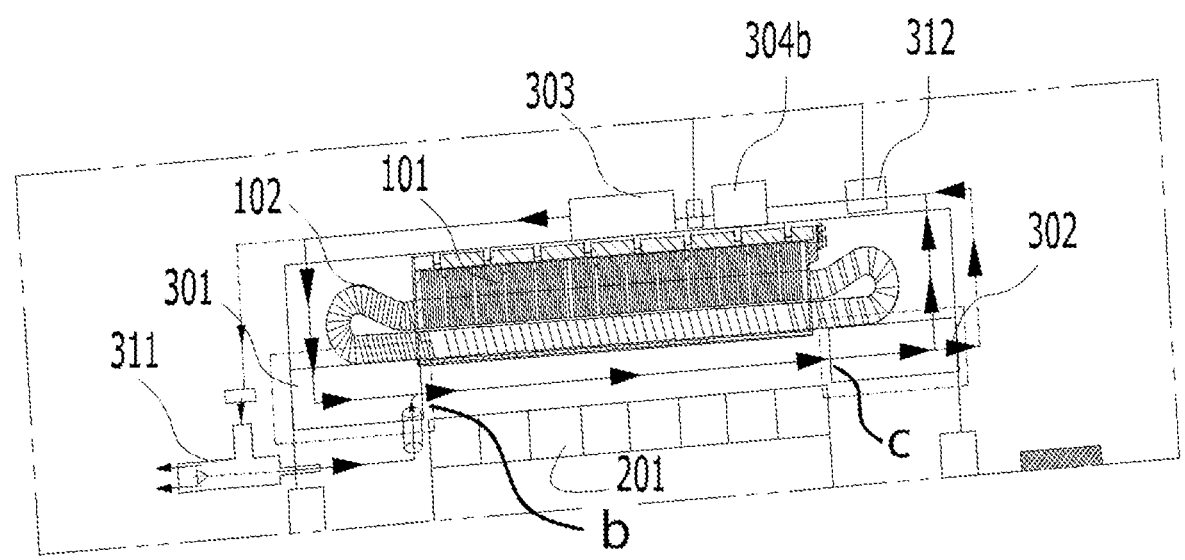
FIG. 26 is a partial enlarged view of part D in FIG. 24.

Referring to FIG. 24, FIG. 24 is a schematic structural diagram of a fourth embodiment of an inner rotor permanent magnet pole motor provided by the present application, the position of the motor in the wind power generation unit is shown; FIG. 25 is a schematic diagram of the motor in FIG. 24; FIG. 26 is a partial enlarged view of part D in FIG. 24.

The motor in this embodiment is a generator, which is arranged in the nacelle 100 of the wind power generation unit. The motor of the fourth embodiment is basically the same as that of embodiment 3. One of the differences is that in embodiment 3, a set of heat exchangers 304 are provided, and in embodiment 4, two sets of heat exchangers are provided, one inside the nacelle 100 and the other outside the nacelle 100. Specifically, the second partition heat exchanger 304b located on the side wall of the motor nacelle 100 and the first partition heat exchanger 304a located outside the top of the nacelle 100 shown in FIG. 25. The airflow from the annular return flow chamber 302 passes through the three-way valve 312, and one part enters the first partition heat exchanger 304a, and the other part enters the second partition heat exchanger 304b. The airflow flows from the first partition heat exchanger 304a and the second partition heat exchanger 304b are sucked by the blower 303 and enter the annular air distribution chamber 301. It can be understood that it is also possible to use only the first partition heat exchanger 304a or the second partition heat exchanger 304b, both of which can improve the heat exchange efficiency and are mutually redundant. When one fails, the other can still maintain normal work.

In addition, as shown in FIG. 24, the second difference between the motor of embodiment 4 and embodiment 3 is that the vortex separator 311 does not deliver the airflow through the delivery flow channel 310 provided on the rotor 20 and the rotating shaft 202, but directly delivers the generated cold airflow or hot airflow to one end port of the air gap a. The vortex separator 311 may continue to be arranged inside the motor, or may be arranged outside as shown in FIG. 24. At this time, the installation of the vortex separator 311 is more convenient. When the required airflow is provided together with the heat exchanger 304, the airflow from the annular air distribution chamber 301 to the air gap a will form a negative pressure at the port position of the air gap a, which is beneficial to introduce the airflow of the vortex separator 311 connected to the port of the air gap a into the air gap a, that is, to bring the airflow of the vortex separator 311 into the air gap a. In the above embodiment, the vortex separator 311 and the air intake nozzle 305 are organically combined, that is, the power of the hot airflow or the cold airflow output by the vortex separator 311 will be reduced after flowing for a certain distance at the outlet, while the pressure at the inlet end of the air intake nozzle 305 will be low after the airflow is injected into the air gap a by the air intake nozzle 305. At this time, the hot airflow or cold airflow output from the vortex separator 311 will naturally diffuse to the inlet end of the air intake nozzle 305 with lower pressure, thus organically combining the vortex separator 311 with the air intake nozzle 305.

In addition, it should be noted that the generation unit in FIG. 24 shows a gearbox 40, and a coupling 205 is provided between the rotating shaft 202 and the gearbox 40, that is, the wind power generation unit is a medium-speed permanent magnet wind power generation unit. Of course, it is also applicable to the direct-drive wind power generation unit without the gearbox 40.

Fifth Embodiment

Figure 27:
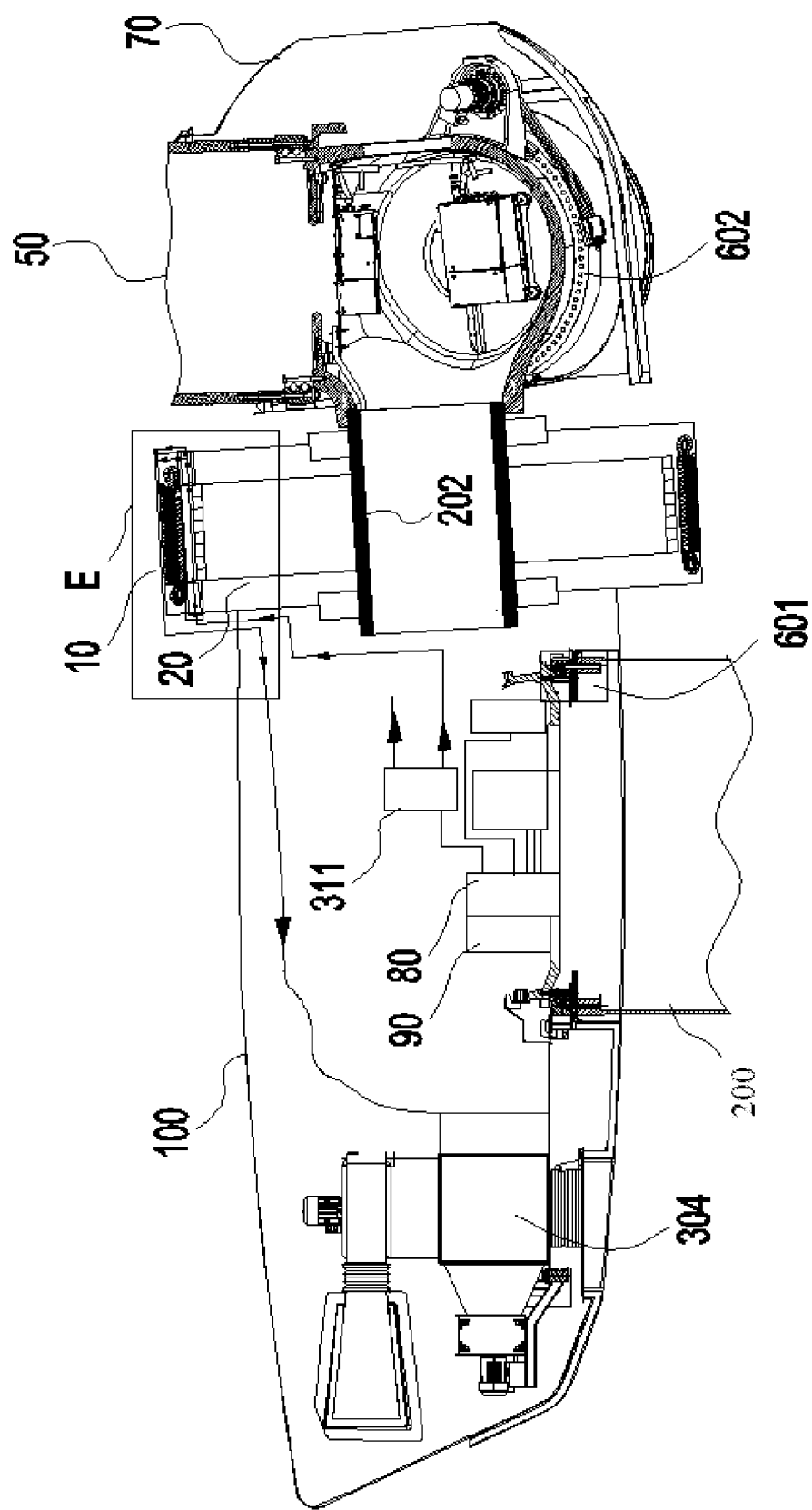
FIG. 27 is a schematic structural diagram of a fifth embodiment of an inner rotor permanent magnet pole motor provided by the present application, the position of the motor in the wind power generation unit is shown.
Figure 28:
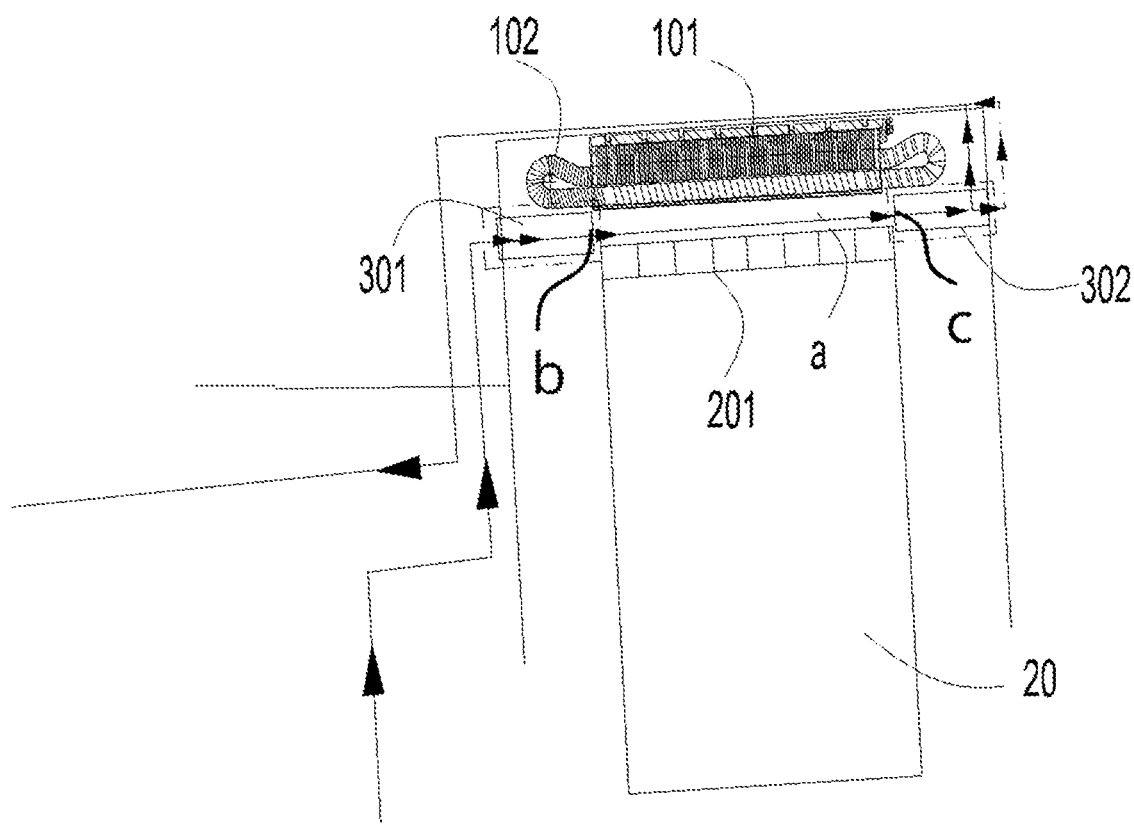
FIG. 28 is a partial enlarged view of part E in FIG. 27.

FIG. 27 is a schematic structural diagram of a fifth embodiment of an inner rotor permanent magnet pole motor provided by the present application, the position of the motor in the wind power generation unit is shown; FIG. 28 is a partial enlarged view of part E in FIG. 27.

This embodiment is basically the same as the fourth embodiment, but in the fifth embodiment, the structure for generating airflow in the airflow delivery device only includes the vortex separator 311, that is, only the vortex separator 311 delivers airflow into the air gap a. As shown in FIG. 27, the vortex separator 311 can be arranged at the base of the nacelle 100, and the tower 200 is installed below the base, and the base of the nacelle 100 has enough installation space for the installation and positioning of the vortex separator 311. The high-pressure airflow of the vortex separator 311 is provided by a compressor 80, and an air-liquid separator 90 may be provided upstream of the compressor 80 to ensure that the airflow entering the air gap a is sufficiently dry.

After the cold or hot airflow generated by the vortex separator 311 enters the air gap a and flows out, it can be led to the partition heat exchanger 304 in the nacelle 100 for heat exchange, and recycled as an internal circulating airflow.

Therefore, in the above embodiment, the annular air distribution chamber 301 is mainly arranged at the port position of the air gap a, and cold airflow or hot airflow is delivered to the annular air distribution chamber 301. As for how the cold airflow or the hot airflow is formed, it is not limited, and it can be formed by the heat exchanger 304 or the vortex separator 311, or both provide feasible solutions. At this time, the position and type of the heat exchanger 304, and the installation position of the vortex separator 311 are not limited. The above embodiments only give several possible installation positions.

It should be noted that, most of the drawings in the above embodiments are described with inner rotor motors. It can be understood that the above solution can obviously also be applied to outer rotor motors, as shown in the following embodiment 6.

Sixth Embodiment

Figure 29:
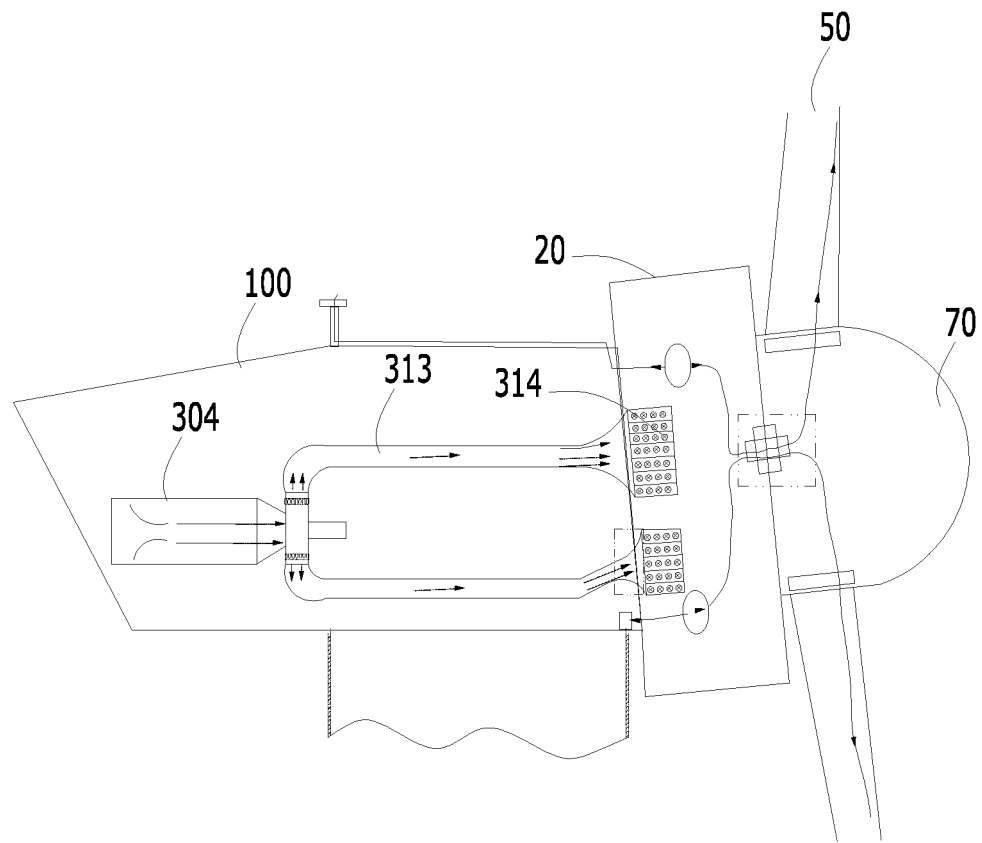
FIG. 29 is a schematic structural diagram of a sixth embodiment of an inner rotor permanent magnet pole motor provided by the present application, the position of the motor in the wind power generation unit is shown.
Figure 30:
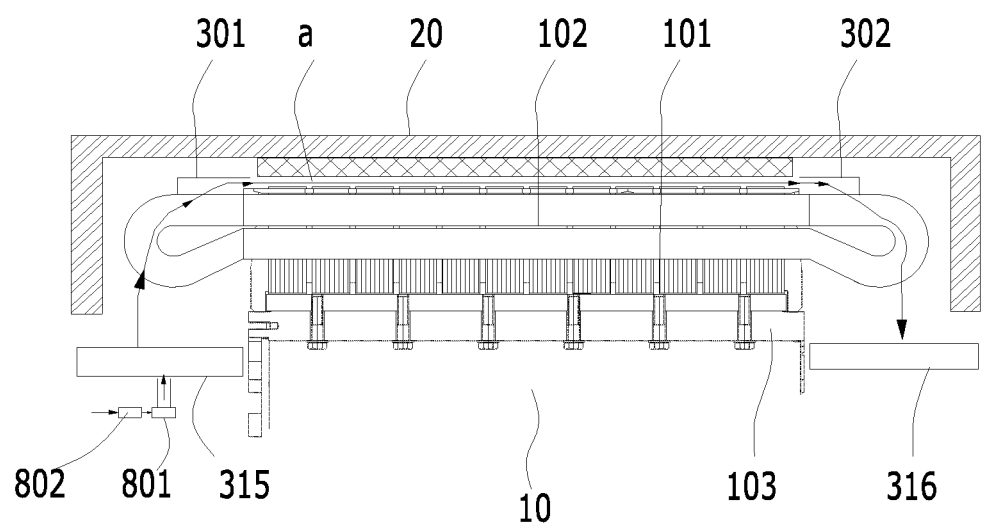
FIG. 30 is an axial sectional view of the motor in FIG. 29.

As shown in FIG. 29 and FIG. 30, FIG. 29 is a schematic structural diagram of a sixth embodiment of an inner rotor permanent magnet pole motor provided by the present application, the position of the motor in the wind power generation unit is shown; FIG. 30 is an axial sectional view of the motor in FIG. 29.

There is also an annular air gap a between the rotor 20 and the stator 10 of the outer rotor motor, and the annular air distribution chamber 301 and the annular return flow chamber 302 can be provided as described in the above embodiments. The air intake nozzle 305, the return flow diffuser pipe 306 and other structures can also be provided, which can be understood with reference to the drawings of this embodiment and the above embodiments, and will not be described in detail.

The rotor 20 provided in the motor in the above embodiment is an inner rotor. When the annular air distribution chamber 301 is provided, it can be directly installed on the end cover of the motor. In embodiment 6, the rotor 20 of the motor is an outer rotor. When the annular air distribution chamber 301 is provided, the annular air distribution chamber 301 can be directly supported at the end of the winding 102, which is equivalent to the end of multiple windings 102 distributed along the ring, as shown in FIG. 30. Correspondingly, the annular return flow chamber 302 can also cover the ends of multiple windings 102, which is convenient for installation.

Of course, a mounting bracket may also be provided on the iron core bracket 103 of the stator 10 to install the annular air distribution chamber 301. When the annular return flow chamber 302 is provided, it can also be mounted on the iron core bracket 103. At this time, when airflow is provided by the vortex separator 311, since the iron core 101 is in the middle of the motor and does not rotate, the vortex separator 311 can be arranged in the inner cavity of the stator 10, or in the nacelle 100 and other positions outside the motor according to the above embodiments, which are all feasible solutions.

As shown in FIG. 29, the airflow delivered to the annular air distribution chamber 301 may also be provided by the heat exchanger 304 in the nacelle 100, and the heat exchanger 304 may be a partition type heat exchanger as shown in FIG. 29. The cold airflow formed by heat exchange enters the annular air distribution chamber 301 and is transported by the transport pipeline 313. At the same time, a transport nozzle 314 is provided. The transport nozzle 314 can be a nozzle with a decreasing flow area along the intake direction or a scaled nozzle (which can also play an accelerating role). The transport pipeline gathers and orderly delivers the cold airflow to the transport nozzle 314, and then the transport nozzle 314 is input into the annular air distribution chamber 301. It is also possible that the transport nozzle 314 is not provided.

As shown in FIG. 30, the airflow may also come from other structures. At this time, a compressor 801 and an air filter 802 are provided to deliver the generated cold airflow or hot airflow to the annular air distribution chamber 301. Other structures can be, for example, a vortex separator 311 connected with the compressor 801. In addition, an inlet interface 315 and an outlet interface 316 are also provided in the motor to allow airflow to flow into and out of the air gap a. The inlet interface 315 and the outlet interface 316 may be provided at the end positions of the iron core bracket 103.

It can be understood that, for the outer rotor solution, there are various ways to input and output the airflow. For example, in the above embodiment, both ends of the air gap a are provided with annular air distribution chambers 301, and airflow flows in from both ends and out from the middle. Or, the airflow flows in from one end to the other end, and is combined with the vortex separator 311. The airflow provided by the vortex separator 311 is located at the port position of the air gap a, and is driven by the airflow in the annular air distribution chamber 301 to enter the air gap a together, which is not described in detail here.

A number of embodiments have been enumerated above to illustrate the improvement of the airflow delivery of the air gap a. provided that the features involved are not contradictory, the various embodiments can be combined with each other. For example, as the air source of cold airflow or hot airflow, the vortex separator 311 can be applied to various embodiments, and the partition heat exchanger 304 can also be applied to various embodiments. The vortex separator 311 and the heat exchanger 304 can be used alone or in combination, and they can directly deliver airflow to the annular air distribution chamber 301, that is, directly pass through the interface of the annular air distribution chamber 301. When the two provide airflow together, the vortex separator 311 or the heat exchanger 304 can deliver airflow to the port of the air gap a through the inner cavity of the rotating shaft 202 (which is also located near the outlet of the annular air distribution chamber 301, and bring the airflow into the air gap a by using negative pressure), and can also directly deliver airflow to the port of the air gap a, which is not described in detail here. The number of vortex separators 311 and heat exchangers 304 is not limited to one.

It should be noted that, in the above embodiment, the airflow input into the air gap a may be hot airflow or cold airflow. After the input cold air temperature rises, it can be recycled and used as cold flow after reheating and cooling. It can also be used to dry other parts of the motor. When the motor is a generator of wind power generation unit, it can also be used to dry other parts of the wind power generation unit. For example, the impeller 50, the pitch bearing 602, the yaw bearing 601 and the like shown in FIG. 25. The vortex separator 311 not only generates cold airflow, but also generates hot airflow, so the hot airflow can also be input to the above position for drying, especially when the motor is in a humid environment and does not work.

In addition, the vortex separator 311 in the above embodiments can also have peak shaving function, for example, it can be turned on according to the season or the change of motor temperature. For example, in winter, due to the natural temperature itself, the heat exchange of the motor can be completed by only using the ventilator. When the external temperature is high or the temperature of the motor is high, and the winding cooling demand of the motor cannot be met, the vortex separator 311 can be turned on for heat exchange.

In addition, the vortex separator 311 may be miniaturized and installed in the nacelle of the wind power generation unit. At this time, if the motor has an outer stator and inner rotor structure, the use of the vortex separator 311 for heat exchange also greatly reduces the noise problem caused by the heat exchange of the wind power generation unit.

In addition, the vortex separator 311 may be installed separately or together with motor components during motor manufacturing. Taking an outer stator and inner rotor motor as an example, when manufacturing the outer stator housing, one or more vortex separators 311 can be installed and arranged on the outer stator along the circumferential direction of the axial gap. The vortex separator 311 can also be installed and arranged together with the end cover of the motor. That is, the vortex separator 311 and the end cover of the non-rotating motor or the stator housing can be manufactured and installed in an integrated manner.

In addition, the above description is mainly based on the generator of a wind power generation unit as an example. Understandably, for motors with other structures, as long as there is an air gap between the rotor and the stator, the airflow can be delivered into the air gap by means of the above embodiments (such as setting an annular air distribution chamber) for better cooling or drying.

It can be seen from the above embodiments, the solution of the present application relies on the field synergy principle of convective heat transfer in heat transfer (including jet impact heat transfer technology), and the "tangential input inner spiral vortex tube" (vortex separator) from the perspective of engineering thermodynamics to innovate motor shaft cooling and innovate cooling of motor rotor and permanent magnet poles. In particular, the centrifugal force (providing the delivery flow channel 310) drives the airflow to the permanent magnet poles or impacts and sprays the surface of the stator core.

Meanwhile, it also innovates the radial cooling of the magnetic pole heat source of the motor rotor, and the rotor shaft also plays the role of strengthening and absorbing the heat energy of the magnetic poles as a heat sink. It can be used to cool the root of the motor heat source (such as magnetic pole) in the radial direction, and make the motor heat source cool and radiate to obtain two channels of radial enhanced heat dissipation. Based on energy conservation, the radial outer surface of the air gap side of the heat source structure of the motor can indirectly reduce the intensity of radiation heat released across the air gap space to the motor stator (winding and its magnetic conductive parts) and its heat dissipation share.

The above are only the preferred embodiments of the present application. It should be noted that, for the person skilled in the art, a few improvements and modifications may be made to the present application without departing from the principle of the present application, and these modifications and improvements are also deemed to fall within the protection scope of the present application.

The invention claimed is:

1. An airflow delivery device for an air gap formed between a rotor and a stator of a motor, the airflow delivery device comprising:
   a first annular air distribution chamber comprising an air distribution chamber main body and an air intake nozzle which are located at one end of the air gap in an axial direction of the motor,
   wherein the first annular air distribution chamber is provided with a delivery port facing the air gap and configured to deliver hot airflow or cold airflow to the air gap, and
   wherein
      the air intake nozzle is configured between the air distribution chamber main body and the air gap to face the air gap at the delivery port and to have a flow area being gradually reduced along an air intake direction.

2. The airflow delivery device according to claim 1, Wherein the air intake nozzle is a converging nozzle, and wherein a jet of the air intake nozzle forms the delivery port.

3. The airflow delivery device according to claim 2, wherein:
   the air distribution chamber main body comprises an annular through cavity; or
   the air distribution chamber main body is separated into more than two sub air distribution chambers along a circumferential direction of the air distribution chamber main body, the air intake nozzle is separated into more than two sub air intake nozzles along a circumferential direction of the air intake nozzle, and each sub air distribution chamber corresponds to one or more sub air intake nozzles of the more than two sub air intake nozzles.

4. The airflow delivery device according to claim 1, further comprising:
   a second annular air distribution chamber located at another end of the air gap; and
   a return flow channel communicating with the air gap,
   wherein the hot airflow or the cold airflow flows to the air gap through the first and second annular air distribution chambers, and flows out of the air gap from the return flow channel.

5. The airflow delivery device according to claim 1, further comprising an annular return flow chamber, wherein:
   the annular return flow chamber is located at another end of the air gap;
   the annular return flow chamber is provided with a return flow port facing the air gap; and
   the hot airflow or the cold airflow flows through the air gap and then flows back to the annular return flow chamber through the return flow port.

6. The airflow delivery device according to claim 5, wherein:
   the annular return flow chamber further comprises a return flow diffuser pipe;
   a flow area of the return flow diffuser pipe is gradually increased along an airflow flow direction; and
   an inlet of the return flow diffuser pipe forms the return flow port.

7. The airflow delivery device according to claim 6, Wherein:
   the annular return flow chamber is an annular through cavity; or
   the annular return flow chamber comprises a return flow chamber main body, the return flow chamber main body is separated into more than two sub return flow chambers along a circumferential direction of the return flow chamber main body, the return flow diffuser pipe is separated into more than two sub return flow diffuser pipes along a circumferential direction of the return flow diffuser pipe, and each sub return flow chamber corresponds to one or more sub return flow diffuser pipes of the more than two sub return flow diffuser pipes.

8. The airflow delivery device according to claim 5, further comprising a heat exchanger,
   wherein the airflow flowing out of the annular return flow chamber is exchanged by the heat exchanger to form the cold airflow or the hot airflow entering the first annular air distribution chamber.

9. The airflow delivery device according to claim 8, wherein:
   the heat exchanger is arranged outside the motor;
   the annular return flow chamber is provided with a first outlet, and the cold airflow or the hot airflow flows out through the first outlet, flows out of the motor after passing through an end of a motor winding, and enters the heat exchanger; or
   the annular return flow chamber is provided with a second outlet, and the cold airflow or the hot airflow directly flows out of the motor through the second outlet and enters the heat exchanger.

10. The airflow delivery device according to claim 8, further comprising a vortex separator,
wherein the hot airflow or the cold airflow generated by the vortex separator is delivered to the air gap.

11. The airflow delivery device according to claim 1, further comprising a vortex separator and a heat exchanger,
wherein the vortex separator and the heat exchanger deliver the hot airflow or the cold airflow to the first annular air distribution chamber.

12. A motor, comprising:
a stator;
a rotor; and
the airflow delivery device for the air gap according claim 1,
wherein the rotor is an inner rotor, and
wherein the annular air distribution chamber covers ends of windings at one end of the stator.

13. A motor, comprising:
a stator;
a rotor;
a rotating shaft; and
the airflow delivery device for the air gap according to claim 1.

14. The motor according to claim 13, wherein:
the airflow delivery device further comprises at least one of a vortex separator or a heat exchanger;
the at least one of the vortex separator or the heat exchanger delivers airflow to the first annular air distribution chamber; and
the vortex separator is mounted on an end cover of the motor, or the motor is a motor having an outer stator and the vortex separator is mounted on a shell of the outer stator.

15. A motor, comprising:
a stator;
a rotor;
a rotating shaft; and
an airflow delivery device for an air gap formed between the rotor and the stator of the motor and comprising an annular air distribution chamber, the annular air distribution chamber comprising an air distribution chamber main body and an air intake nozzle which are located at one end of the air gap in an axial direction of the motor,
wherein:
the annular air distribution chamber is provided with a delivery port facing the air gap and configured to deliver hot airflow or cold airflow to the air gap;
the air intake nozzle is configured between the air distribution chamber main body and the air gap to face the air gap at the delivery port and to have a flow area being gradually reduced along an air intake direction;
the rotor is an inner rotor;
the motor is provided with a delivery flow channel which penetrates a side wall of the rotating shaft and the rotor to communicate an inner cavity of the rotating shaft and the air gap; and
the cold airflow or the hot airflow generated by a vortex separator is transported into the inner cavity of the rotating shaft and enters the delivery flow channel.

16. A wind power generation unit, comprising a nacelle and a generator provided inside the nacelle, wherein the generator comprises the motor according to claim 15.

17. The wind power generation unit according to claim 16, wherein:
the airflow delivery device further comprises a vortex separator and a heat exchanger;
the vortex separator and the heat exchanger deliver the hot airflow or the cold airflow to the annular air distribution chamber; and
the heat exchanger is provided inside or outside the nacelle of the wind power generation unit.

18. The wind power generation unit according to claim 17, wherein:
the heat exchanger is a partition heat exchanger arranged in the nacelle; and
the airflow delivery device further comprises a transport pipeline, and the transport pipeline transports the airflow out of the partition heat exchanger to the annular air distribution chamber.

19. A motor, comprising:
a stator;
a rotor;
a rotating shaft; and
an airflow delivery device for an air gap formed between the rotor and the stator of the motor, comprising:
a first annular air distribution chamber comprising an air distribution chamber main body and an air intake nozzle which are located at one end of the air gap in an axial direction of the motor; and
a second annular air distribution chamber located at another end of the air gap, wherein:
the first annular air distribution chamber is provided with a delivery port facing the air gap and configured to deliver hot airflow or cold airflow to the air gap;
the air intake nozzle is configured between the air distribution chamber main body and the air gap to face the air gap at the delivery port and to have a flow area being gradually reduced along an air intake direction;
the rotor is an inner rotor;
the motor is provided with at least one return flow channel, and the at least one return flow channel penetrates a side wall of the rotating shaft and the rotor to communicate an inner cavity of the rotating shaft and a middle of the air gap; and
the cold airflow or the hot airflow flows to the air gap through the first and second annular air distribution chambers, flows out of the air gap through the at least one return flow channel, and enters the inner cavity of the rotating shaft.

20. The motor according to claim 19, wherein:
the at least one return flow channel comprises two or more return flow channels distributed along a circumferential direction of the motor;
the inner cavity of the rotating shaft is provided with a confluence chamber, and the airflow in each of the two or more return flow channels flows into the confluence chamber and leads out of the inner cavity of the rotating shaft; and
the inner cavity of the rotating shaft is provided with an induced draft fan to draw out the airflow in the confluence chamber.

* * * * *